United States Patent
Yang et al.

[11] Patent Number: 6,000,614
[45] Date of Patent: Dec. 14, 1999

[54] TWO-DIMENSIONAL CODE READING APPARATUS

[75] Inventors: Xuhua Yang, Chiryu; Masahiro Hara, Nagoya, both of Japan

[73] Assignee: Denso Corporation, Kariya, Japan

[21] Appl. No.: 08/996,345

[22] Filed: Dec. 22, 1997

[30] Foreign Application Priority Data

| Dec. 20, 1996 | [JP] | Japan | 8-341354 |
| Dec. 24, 1996 | [JP] | Japan | 8-343851 |
| Dec. 8, 1997 | [JP] | Japan | 9-337223 |

[51] Int. Cl.⁶ ........................... G06K 7/10
[52] U.S. Cl. ............. 235/460; 235/462.1; 235/494; 235/456
[58] Field of Search ............. 235/460, 462.08, 235/462.09, 462.1, 462.11, 494, 456

[56] References Cited

U.S. PATENT DOCUMENTS

| 4,924,078 | 5/1990 | Sant'Anselmo et al. | 235/494 |
| 4,939,354 | 7/1990 | Priddy et al. | 235/456 |
| 5,053,609 | 10/1991 | Priddy et al. | 235/456 |
| 5,189,292 | 2/1993 | Batterman et al | 235/494 |
| 5,288,986 | 2/1994 | Pine et al. | 235/494 |
| 5,343,031 | 8/1994 | Yoshida | 235/494 |
| 5,410,620 | 4/1995 | Yoshida | 235/494 X |
| 5,541,396 | 7/1996 | Rentsch | 235/454 |
| 5,591,956 | 1/1997 | Longacre, Jr. et al. | 235/494 |
| 5,691,527 | 11/1997 | Hara et al. | 235/456 |
| 5,726,435 | 3/1998 | Hara et al. | 235/294 |

FOREIGN PATENT DOCUMENTS

| 0 670 555 | 6/1995 | European Pat. Off. |
| 8-185492 | 7/1996 | Japan |

*Primary Examiner*—Michael G. Lee
*Assistant Examiner*—Diane I. Lee
*Attorney, Agent, or Firm*—Pillsbury Madison & Sutro LLP

[57] ABSTRACT

A two-dimensional code reading apparatus uses the image of a reference pattern of a known shape in the two-dimensional code to compute areas, shapes and positions of cells in the image of the two-dimensional code and corrects these computed values using correction values obtained by identifying cells isolated from cells of the same type in at least one direction whenever they appear and extracting their actual boundary coordinates directly from the image data. As a result, even if there is distortion in the image of the two-dimensional a reading scope for each cell to be read is set to a suitable area and the reading position of each cell is determined accurately in correspondence with the distortion and the content of the two-dimensional code is thereby read correctly.

55 Claims, 11 Drawing Sheets

FIG. 3A
FIG. 3B
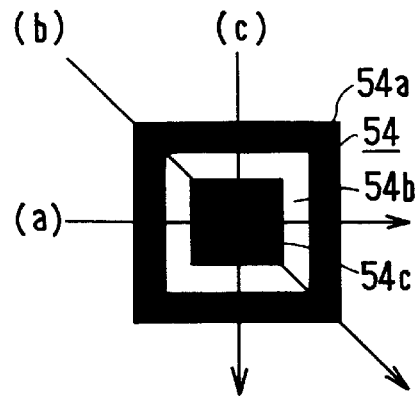
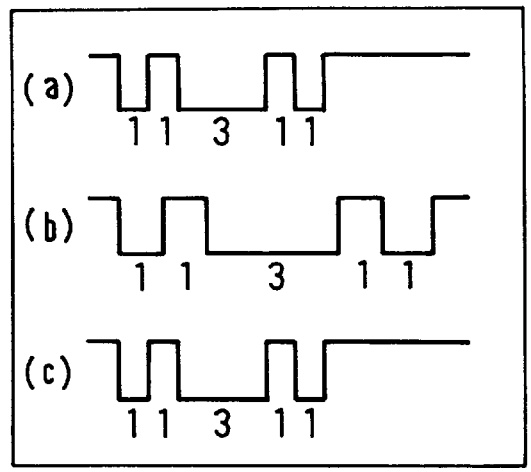
FIG. 4A
CCD OUTPUT
FIG. 4B
BINARIZING CKT. OUTPUT
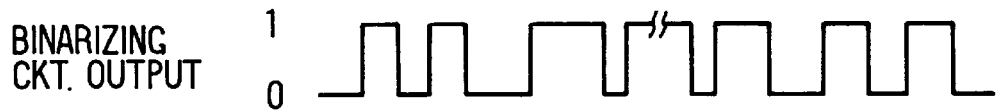
FIG. 6
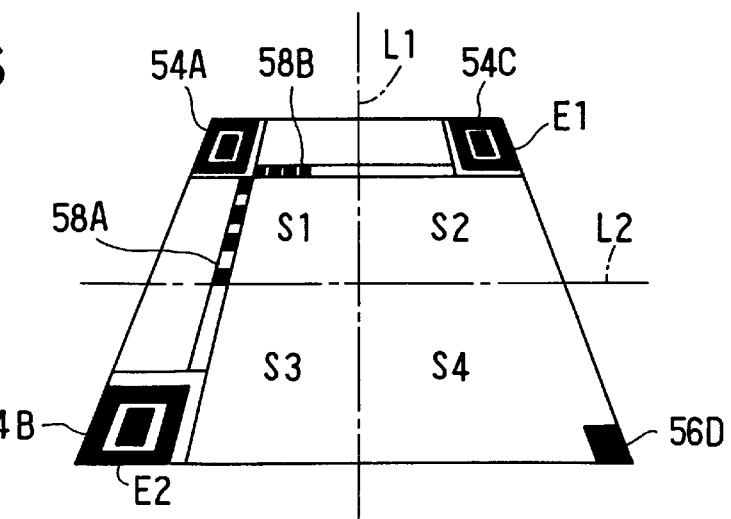

6,000,614

TWO-DIMENSIONAL CODE READING APPARATUS

CROSS REFERENCE TO RELATED APPLICATION

This application is based upon and claims the benefit of priority of Japanese Patent Applications No. H.8-341354 filed on Dec. 20, 1996, No. H.8-343851 filed on Dec. 24, 1996, and No. H.9-337223 filed on Dec. 8, 1997, the contents of which are incorporated herein by reference.

BACKGROUND OF THE INVENTION

1. Field of the Invention

This invention relates to a two-dimensional code reading apparatus for reading a matrix type two-dimensional code.

2. Related Art

Two-dimensional codes can record large amount of information compared with one-dimensional codes such as bar codes. In a two-dimensional code, each entry in a matrix is either black or white. That is, a two-dimensional code expresses data as a pattern of entries. These entries constituting basic units of data expression are called cells. To read data expressed by a two-dimensional code correctly, it is necessary to distinguish correctly the black/white type of each cell.

An example of this kind of two-dimensional code reading apparatus is disclosed in Japanese Patent Application Laid-Open No. 8-180125.

A two-dimensional code reading apparatus detects an image of a two-dimensional code. When processing this as image data, the two-dimensional code reading apparatus usually carries out processing in pixel units. Accordingly, the obtained image data of each cell is also made up of a plurality of pixels.

For example, suppose that an image G of a black cell has been read in as 3×3=9 pixels. Then suppose that of these nine pixels, due to print blurring or soiling of the two-dimensional code, three have been detected as white pixels WT. In determination of the type of the cell under such circumstances, the type of the majority of the pixels is determined to be the type of the cell. In the example shown in FIG. 14A, because there are six black pixels BK and three white pixels WT, the type of the cell is determined to be black.

The number of pixels for determining the type of each cell, that is, the reading scope for one cell, has normally been set on the basis of a predetermined reference pattern existing in the two-dimensional code. For example, position detection patterns A, B and C and an extension pattern D whose positions and sizes can be obtained at the initial stage of reading are provided in the two-dimensional code. The size of one cell (a height and a width) is obtained from one of these and the obtained size is used to determine a number of pixels as a reading scope for each cell. In consideration of for example reading position errors, this number of pixels is sometimes set so that a reading scope is slightly smaller than the cell size obtained.

However, the two-dimensional code is not always detected without distortion as shown in FIG. 14B. Sometimes the two-dimensional code is read at an angle and there is distortion in the detected image, as shown in FIG. 15. In this case, the cell size will change depending on which of the position detection patterns A, B and C and the extension pattern D is used to determine the cell size. In the example of FIG. 15, because the position detection patterns A and C become small as image data, the size of a reading scope of one cell determined on the basis of either of them is inevitably small and the number of pixels used for determining cell type then is small. The position detection pattern B, on the other hand, becomes larger as image data than the position detection patterns A and C. As a result, the number of pixels for determining cell type becomes large.

Consequently, it is difficult to make the determination of which cell size determined based on each of the position detection patterns and the extension pattern should be used to determine the size of the cells. For example, to determine the size of cells, it is conceivable to employ an average value of different cell sizes determined using each of the position detection patterns respectively; however, when this is done, type determination using an excessive number of pixels may be carried out on cells in the vicinity of the position detection patterns A and C and type determination using too few pixels is carried out on cells in the vicinity of the position detection pattern B and the extension pattern D.

In FIG. 16A, when the nine pixels (3×3 pixels) of the scope shown with a solid line is a suitable number of pixels for reading the cell and this number of pixels is correctly set, there are six black pixels and three white pixels in that scope. Accordingly the type of the cell is determined on a majority basis to be black. However, when the 25 pixels (5×5 pixels) of an excessively large scope is set as the number of pixels for determining the type of the cell, because there are eleven black pixels and fourteen white pixels, on the same majority basis the cell is determined to be white and the type of the cell thus is not determined correctly.

This is also the same in reverse. That is, a cell determined to be white with a suitable 25 pixels may be mistakenly determined to be black with an insufficient 9 pixels.

It is therefore a first object of the present invention to provide a two-dimensional code reading apparatus which can set a scope for determining cell types suitably even when there is distortion in the detected two-dimensional image.

Also, to carry out black/white determination of cells correctly, it is important to accurately determine the center position of each cell.

In reading processing for the kind of two-dimensional code shown in FIG. 14B, first, three position detection patterns A, B, C are detected from the characteristics of the pattern. Then, timing cell rows E, F wherein white and black cells are disposed alternately running between these position detection patterns A, B, C are detected. Then, by image processing, the center positions of the cells of the position detection patterns A, B, C and the timing cell rows E, F are detected. When the center positions of these cells have been determined, the center positions of the other cells are obtained by calculation using the coordinates of the center positions of these cells.

That is, when the position detection patterns are scanned, predetermined frequency component ratios can be obtained from them, and on this basis the center coordinates of the position detection patterns A, B, C are determined first. Also, because the overall shapes of the position detection patterns A, B, C are predetermined, the center positions of the cells making up the position detection patterns A, B, C can also be obtained by calculation. The positions of the timing cells rows E, F disposed in predetermined positions between the position detection patterns A, B, C can also be obtained by calculation. Since the timing cell rows E, F consist of black and white cells disposed alternating cell by cell, by finding the boundaries of the cells by image processing the center positions of the cells making up the timing cell rows E, F can also be determined.

Then, with the cells making up the position detection patterns A, B, C and the timing cell rows E, F whose positions have been determined as described above as reference cells, from coordinate values of these reference cells, it is possible to obtain by calculation on the basis of cell widths and heights the positions of the cells other than those of the position detection patterns A, B, C and the timing cell rows E, F, that is, the positions of the so-called data cells.

Because it is possible to obtain the positions of all of the data cells in this way, by reading the data cells from these positions it is possible to detect the data expressed by the two-dimensional code.

However, the two-dimensional code is not always detected without distortion as shown in FIG. 14B, and sometimes the two-dimensional code is read at an angle and there is distortion in the detected image, as shown in FIG. 15. In this kind of case, for data cells near the position detection patterns A, B, C or the timing cell rows E, F, the positional deviation between the reading positions obtained by calculation and the actual positions of the cells is small. Therefore, reading of the cells is carried out correctly. However, with progress away from the position detection patterns A, B, C and the timing cell rows E, F the positional deviation between the reading positions and the actual cell positions becomes larger and it becomes impossible to correctly determine the types of the cells.

It is therefore a second object of the invention to provide a two-dimensional code reading apparatus which can set positions for reading cells correctly even when there is distortion in the detected two-dimensional image.

SUMMARY OF THE INVENTION

To achieve the above-mentioned first object, the invention provides a two-dimensional code reading apparatus for reading a two-dimensional code wherein data is expressed as a pattern of black and white cells in a two-dimensional matrix. The two-dimensional code reading apparatus comprises a two-dimensional image detecting device for detecting an image of a two-dimensional code, a reference pattern detecting device for detecting a reference pattern of a predetermined shape existing in the two-dimensional image detected by the two-dimensional image detecting device, a cell shape calculating device for obtaining the area of a cell of the two-dimensional code in the two-dimensional image on the basis of the reference pattern detected by the reference pattern detecting device, a reading control device for when a cell is to be read from the two-dimensional image adjusting the size of a reading scope from which the cell is to be read with respect to the cell area obtained by the cell shape calculating device according to the distance of the cell from the reference pattern, and a cell reading device for at the position of each cell of the two-dimensional image reading the cell from the scope adjusted by the reading control device.

A cell close to a reference pattern in distance can be considered to be close in size to a cell size determined on the basis of the reference pattern.

In this invention, in reading a cell from a two-dimensional image, the size of a reading scope from which the cell is read is adjusted with respect to a cell area obtained by the cell shape calculating device according to the distance of the cell from the reference pattern. As a result of this the cell is read by the cell reading device from a scope of a suitably adjusted size. Therefore, even if there is distortion in the image of the two-dimensional code, because the reading scope from which the cell content is read is set to a suitable area in correspondence with the distortion, the contents of cells are read correctly.

Also, a two-dimensional code reading apparatus according to the invention may comprise a two-dimensional image detecting device for detecting an image of a two-dimensional code, a reference pattern detecting device for detecting a reference pattern of a predetermined shape existing in the two-dimensional image detected by the two-dimensional image detecting device, a cell shape calculating device for obtaining the area of a cell of the two-dimensional code in the two-dimensional image on the basis of the reference pattern detected by the reference pattern detecting device, a cell grouping device for grouping cells of the two-dimensional code in the two-dimensional image with the position of the reference pattern detected by the reference pattern detecting device as a reference, a reading control device for when the cells are to be read from the two-dimensional image adjusting for each group of cells formed by the cell grouping device the size of a reading scope from which the content of each of the cells in the group is to be read with respect to a cell area obtained by the cell shape calculating device, and a cell reading device for at the position of each cell of the two-dimensional image reading the content of the cell with the reading scope adjusted group by group by the reading control device.

That is, in this apparatus, with respect to a cell area obtained by the cell shape calculating device, the size of a reading scope from which the content of each of the cells in a group is to be read is adjusted for each group of cells grouped by the cell grouping device.

The cell areas of the cells in a group existing in the vicinity of a reference pattern can be considered to be close to a cell area obtained on the basis of that reference pattern. Conversely, the cell areas of cells in a group existing in a position far from a reference pattern differ greatly from a cell area obtained on the basis of that reference pattern. For this reason, in this apparatus, with respect to a cell area obtained on the basis of a reference pattern, the size of the reading scope from which the content of each cell is to be read is adjusted group by group. As a result, the contents of cells are read by the cell reading device from a scope of a size suitably determined group by group. Therefore, even if there is distortion in the image of the two-dimensional code, because the reading scope from which the cell content is read is set to a suitable area in correspondence with the distortion, the contents of cells are read correctly.

Also, a two-dimensional code reading apparatus according to the invention may comprise a two-dimensional image detecting device for detecting an image of a two-dimensional code, a reference pattern detecting device for detecting a reference pattern of a predetermined shape existing in the two-dimensional image detected by the two-dimensional image detecting device, a cell shape calculating device for obtaining the shape of a cell of the two-dimensional code in the two-dimensional image on the basis of the reference pattern detected by the reference pattern detecting device, a reading control device for when the content of a cell is to be read from the two-dimensional image adjusting the shape of a reading scope from which the content of the cell is to be read with respect to the cell shape obtained by the cell shape calculating device according to the distance of the cell from the reference pattern, and a cell reading device for at the position of each cell of the two-dimensional image reading the content of the cell from the scope adjusted by the reading control device.

In the case of this construction also, the cell reading device can read the contents of cells from a scope of a suitably determined shape. Therefore, even if there is distortion in the image of the two-dimensional code, because the reading scope from which the cell content is read is set to a suitable shape in correspondence with the distortion, the contents of cells are read correctly.

Also, a two-dimensional code reading apparatus according to the invention may comprise a two-dimensional image detecting device for detecting an image of a two-dimensional code, a reference pattern detecting device for detecting a reference pattern of a predetermined shape existing in the two-dimensional image detected by the two-dimensional image detecting device, a cell shape calculating device for obtaining the shape of a cell of the two-dimensional code in the two-dimensional image on the basis of the reference pattern detected by the reference pattern detecting device, a cell grouping device for grouping cells of the two-dimensional code in the two-dimensional image with the position of the reference pattern detected by the reference pattern detecting device as a reference, a reading control device for when the contents of cells are to be read from the two-dimensional image adjusting for each group of cells formed by the cell grouping device the shape of a reading scope from which the content of each of the cells in the group is to be read with respect to a cell shape obtained by the cell shape calculating device, and a cell reading device for at the position of each cell of the two-dimensional image reading the content of the cell from the scope adjusted group by group by the reading control device.

In the case of this construction also, the cell reading device can read the contents of cells from a scope of a shape suitably determined group by group. Therefore, even if there is distortion in the image of the two-dimensional code, because the reading scope from which the cell content is read is set to a suitable shape in correspondence with the distortion, the contents of cells are read correctly.

To reduce the influence of reading position error, the scope adjusted by the reading control device may be set smaller than the size of the cells. That is, when there is error in the detected position of a cell, influences of other cells arise in parts of the reading scope. However, by making the reading scope small with respect to the shape or area obtained by the cell shape calculating device, these influences can be eliminated and more accurate reading can be made possible.

When the cell reading device is constructed to read for each pixel included in the reading scope whether the type of the pixel is black or white, the type of the pixels constituting the majority of all the pixels may be determined to be the content of the cell.

When the various devices in this kind of two-dimensional code reading apparatus are constructed by a computer system, the functions of the various devices for example can be realized as a computer program started on the computer system side. This kind of program can for example be stored in a storage medium such as a floppy disk, an opto-magnetic disk or a CD-ROM and loaded into the computer system for use when necessary. Or, the program may be stored in a storage medium such as a ROM or a backup RAM and this ROM or backup RAM built into the computer system.

To achieve the above-mentioned second object the invention, in the two-dimensional code reading apparatus according to the invention, in reading a two-dimensional code wherein binary code data is expressed as a pattern of black and white cells in a two-dimensional matrix, a reference position determining device determines a reference position where a pattern of a predetermined shape lies in a two-dimensional image detected by a two-dimensional image detecting device on the basis of that predetermined shape. Also, a cell size determining device determines the size of a cell in the two-dimensional code from the pattern of this pattern of a predetermined shape. Then, a cell position determining device determines the position of each of cells from the reference position determined by the reference position determining device on the basis of the cell size determined by the cell size determining device. A cell reading device then reads the light/dark type of the cell from the cell position determined by the cell position determining device. Thereafter it is distinguished by an isolated cell distinguishing device whether or not a cell having been read and had its type determined in this way is an isolated cell. When it is determined by the isolated cell distinguishing device that the cell is an isolated cell, an actual position determining device determines the actual position of the isolated cell on the basis of the two-dimensional image of the isolated cell. That is, for isolated cells, separately from the computed cell position, the actual cell position is directly obtained from the image. Then, from the computed cell position and the actual cell position, a cell position correction value calculating device obtains a correction value for correcting the computed cell position. This correction value is then reflected in the processing of the cell position determining device to correct cell positions subsequently obtained by the cell position determining device. By means of this correction value obtained on the basis of an isolated cell, for the cell positions of subsequent cells, the computed cell position is not used as it is but rather the computed cell position is corrected to obtain an accurate reading position and the type of the cell is read from this accurate reading position. Therefore, even if a positional deviation becomes larger with progress away from the pattern of a predetermined shape, because the computed cell position is corrected every time an isolated cell appears, the contents of each cell can always be read from a correct cell position. As a result, even if there is distortion in the detected two-dimensional image, a position for reading the contents of each cell can be set suitably and the content of the two-dimensional code can thereby be read accurately.

As an isolated cell, a cell sandwiched in an x-direction or a y-direction between cells of the opposite type can be used. For example, when an isolated cell is a cell sandwiched in an x-direction between cells of the opposite type, because clear boundaries appear in the image, by image processing it is easy to find the boundaries between that isolated cell and the cells adjacent thereto in the x-direction. Since the boundaries obtained by image processing show actual x-coordinates of the boundaries of the isolated cell in the image, from them the actual x-coordinate of the center position of the isolated cell can also be easily obtained. Therefore, by comparison of the computed x-coordinate and the actual x-coordinate of the isolated cell, it becomes clear to what degree the actual x-coordinates and the computed x-coordinates of cells are deviating at the position of this isolated cell. Thus, if the computed x-coordinates of subsequent cells are corrected using a correction value obtained from this degree of deviation, the deviation of the computed x-coordinates can be easily corrected.

Similarly, if there is an isolated cell sandwiched in a y-direction between cells of the opposite type, because an accurate y-coordinate can be obtained, deviation in the computed y-coordinate can be easily corrected. Therefore, if this correction value is used to correct the computed positions of non-isolated cells processed thereafter, over the entire two-dimensional code, deviation of the computed positions of cells can be corrected and accurate cell positions determined and the code thereby read correctly.

The isolated cell may be a cell sandwiched by cells of the opposite type in both the x-direction and the y-direction. When a single isolated cell is sandwiched by cells of the opposite type in both the x-direction and the y-direction like this, it is possible to obtain correction values for correcting deviation in the computed x-coordinate and deviation in the computed y-coordinate simultaneously from a single isolated cell. Therefore, subsequent cell position determinations can be carried out still more accurately.

Preferably, the pattern of the predetermined shape includes a position detection pattern consisting of a pattern from which the same frequency component ratios can be obtained with a scan line crossing the center of the pattern irrespective of the angle of the scan line, disposed in each of at least two predetermined positions in the two-dimensional code. When this kind of position detection pattern is used, the position detection patterns can be easily and rapidly detected directly by a circuit for detecting frequency component ratios. The frequency component ratios may for example be light/dark component ratios discussed hereinafter.

Also, the pattern of a predetermined shape may include rows of timing cells running between the position detection patterns wherein cells of opposite types are disposed alternately. In this case, for all of the cells in the two-dimensional code a computed position can be obtained easily from the coordinates of the position detection patterns and the timing cell rows, and still more accurate positioning and reading operation becomes possible.

Specifically, the position detection patterns may exist at three of the corners of the matrix of the two-dimensional code and the cell position determining device may be made to determine cell positions starting from the cells around the position detection pattern having the other position detection patterns on either side of it. When this is done, correct positioning and reading of the cells of the entire two-dimensional code with the initial positioning accuracy maintained become possible.

When the various devices in this kind of two-dimensional code reading apparatus are realized by means of a computer system, the functions of the various devices for example can be realized as a computer program started on the computer system side. This kind of program can for example be stored in a storage medium such as a floppy disk, an opto-magnetic disk or a CD-ROM and loaded into the computer system for use when necessary. Or, the program may be stored in a storage medium such as a ROM or a backup RAM built into the computer system.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 3A and 3B are views illustrating light/dark detection of when a position detection pattern is scanned;

FIGS. 4A and 4B are waveform views of output signals of a CCD and a binarizing circuit;

FIG. 6 is a view illustrating grouping areas in an image of a two-dimensional code;

DETAILED DESCRIPTION OF THE PREFERRED EMBODIMENTS

Figure 1:
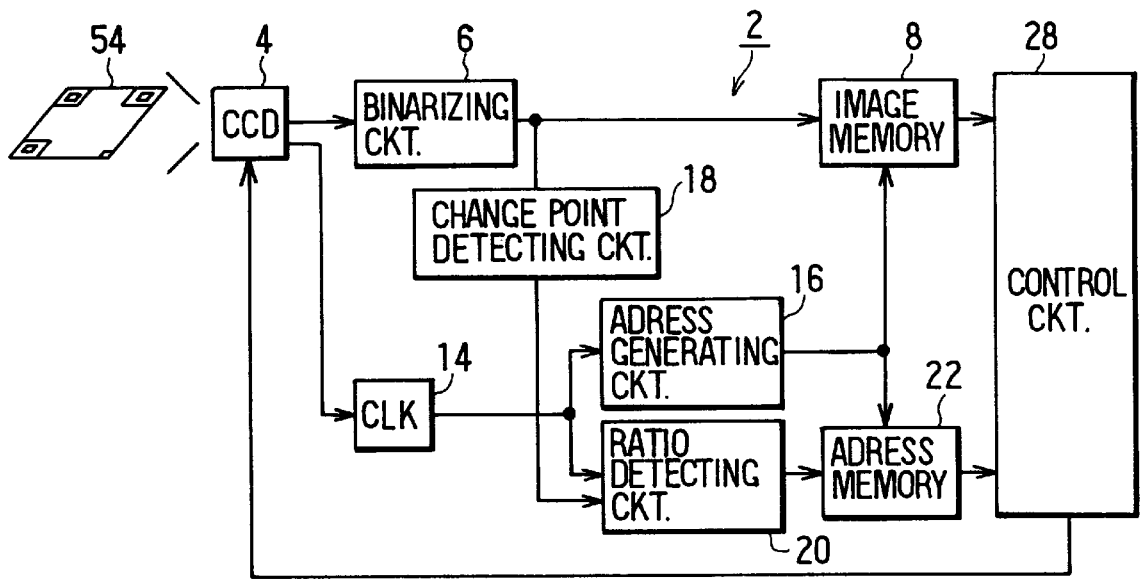
FIG. 1 is a block diagram showing the outline construction of a two-dimensional code reading apparatus according to a first preferred embodiment of the present invention.

The outline construction of a two-dimensional code reading apparatus 2 according to a first preferred embodiment of the present invention is shown in the block diagram of FIG. 1.

This two-dimensional code reading apparatus 2 is made up of a CCD 4, a binarizing circuit 6, an image memory 8, a clock signal outputting circuit 14, an address generating circuit 16, a change point detecting circuit 18, a ratio detecting circuit 20, an address memory 22 and a control circuit 28.

The control circuit 28 is a computer system comprising a CPU, ROM, RAM and I/O devices and so on, and according to a program stored in ROM executes two-dimensional code reading processing and the like and controls the components of the two-dimensional code reading apparatus 2.

Figure 2:
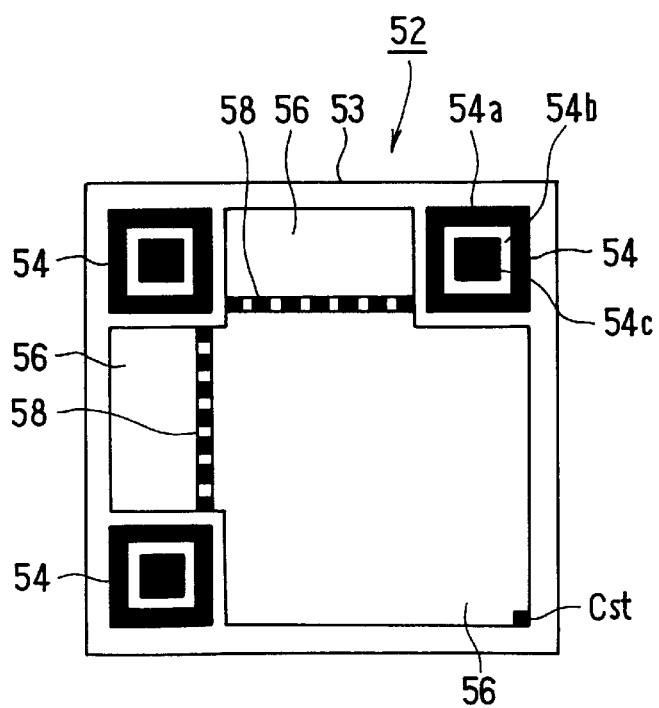
FIG. 2 is a view illustrating the format of a two-dimensional code.

An example of a two-dimensional code detected by the two-dimensional code reading apparatus 2 is shown in FIG. 2. This two-dimensional code 52 is printed on a white card 53 and is made up of three position detection patterns 54, a data area 56, and an extension pattern Cst. As a whole these are arrayed in a square having the same number of cells in vertical and horizontal directions (29 cells×29 cells). The cells each are one of two optically different types, and in the figures and the following description they are distinguished as white (light) and black (dark). In FIG. 2, to make the drawing clearer, the pattern of the data cells in the data area 56 is not shown.

The position detection patterns 54 are disposed at three of the four corners of the two-dimensional code 52. The position detection patterns 54 each have a pattern wherein inside a black framelike square 54a a smaller white framelike square 54b is formed and inside that a still smaller black solid square 54c is formed.

The control circuit 28 carries out the following reading control.

First, on a command from the control circuit 28, the CCD 4, which constitutes two-dimensional image detecting means, detects a two-dimensional image of a place through which the two-dimensional code 52 is passing. When the CCD 4 detects the two-dimensional image, it outputs two-dimensional image data as a signal having various levels of the kind shown in FIG. 4A. This two-dimensional image data is then binarized by the binarizing circuit 6 using a threshold value issued from the control circuit 28. Specifically, as shown in FIG. 4B, it is converted into a signal made up of the two levels of 1 (high) and 0 (low).

According to a synchronizing pulse outputted from the CCD 4, the clock signal outputting circuit 14 outputs a clock pulse amply finer than the pulse of the two-dimensional image data outputted from the CCD 4. The address generating circuit 16 counts this clock pulse and generates addresses of the image memory 8. The binarized two-dimensional image data is written into the image memory 8 in units of eight bits per each of these addresses.

At the time of a change from '1' to '0' or a change from '0' to '1' in the signal from the binarizing circuit 6, the change point detecting circuit 18 outputs a pulse signal to the ratio detecting circuit 20. By counting the clock pulse outputted from the clock signal outputting circuit 14 between consecutive pulse signals inputted from the change point detecting circuit 18, the ratio detecting circuit 20 obtains lengths over which light portions (1) continue and lengths over which dark portions (0) continue in the two-dimensional image. From the ratios of these lengths, the position detection pattern 54 of the two-dimensional code 52 is detected.

The light/dark patterns on scan lines (a), (b) and (c) of the CCD 4 crossing the approximate center of a position detection pattern 54 at representative angles as shown in FIG. 3A all have the same string of light/dark component ratios, as shown in FIG. 3B. That is, the string of light/dark component ratios of each of the scan lines (a), (b) and (c) crossing the center of the position detection pattern 54 is dark:light:dark:light:dark=1:1:3:1:1. And of course the ratios on scan lines at angles between those of these scan lines (a), (b) and (c) are also 1:1:3:1:1. Further, even if the figure in FIG. 3A is disposed in a plane diagonal as seen from the CCD 4 side, the light/dark component ratios on the scan lines (a), (b) and (c) are still dark:light:dark:light:dark= 1:1:3:1:1. The waveforms shown in FIG. 3B correspond to the binarized signal from the binarizing circuit 6.

On this basis, the ratio detecting circuit 20 detects this string of light/dark component ratios '1:1:3:1:1', and when it does the address memory 22 stores the image memory address generated by the address generating circuit 16 at that time.

Thus, when the CCD 4 has detected one frame of two-dimensional image data, this two-dimensional image data is stored binarized in the image memory 8. In addition, the addresses of the detected position detection patterns 54 are stored in the address memory 22.

When the image of a first frame of two-dimensional image data is obtained, the control circuit 28 carries out two-dimensional code reading processing which will be further discussed later on the basis of the data stored in the image memory 8 and the address memory 22. When this processing finishes the control circuit 28 instructs the CCD 4 to detect another frame of two-dimensional image data. Accordingly, a two-dimensional image is outputted from the CCD 4 to the binarizing circuit 6 again and the processing described above is repeated.

Figure 5:
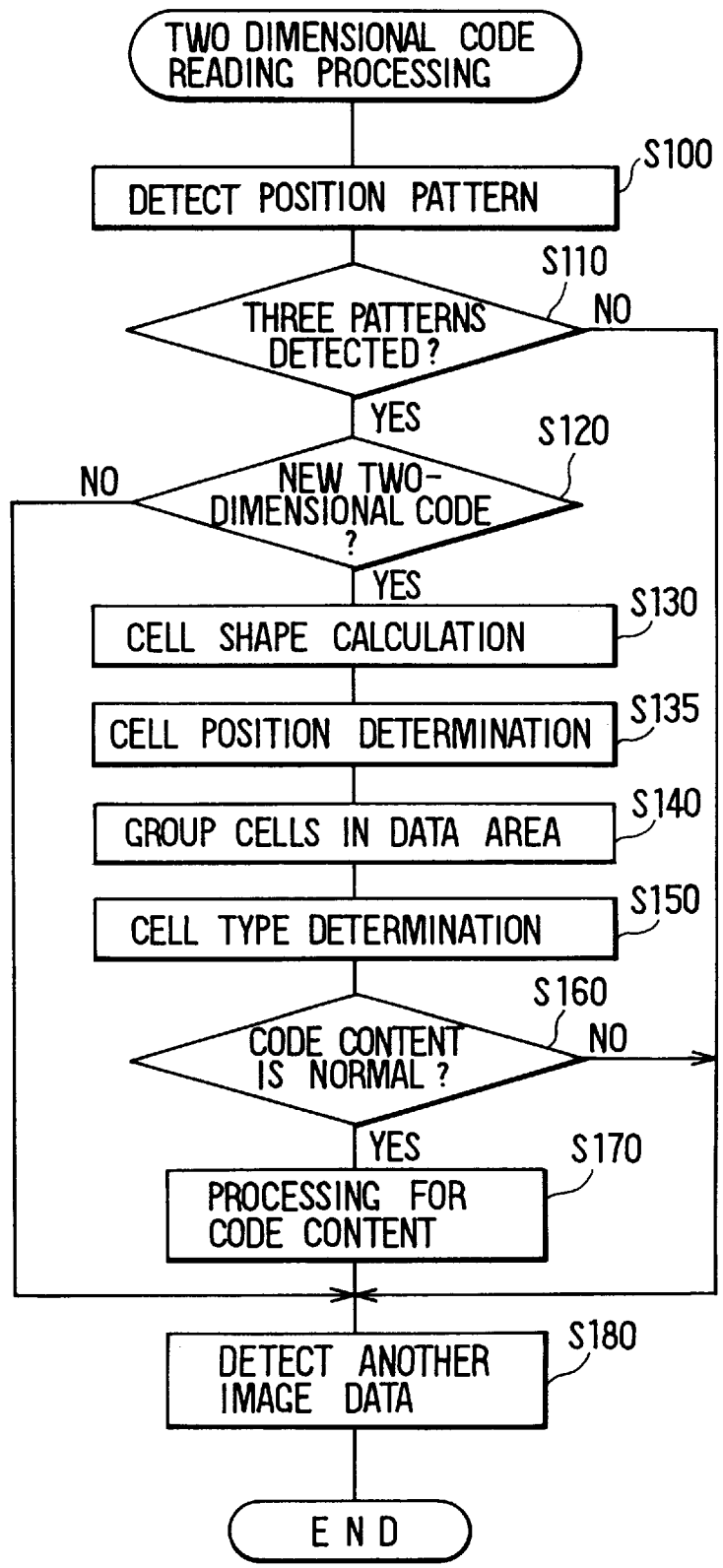
FIG. 5 is a flow chart of two-dimensional code reading processing carried out by the two-dimensional code reading apparatus.

The two-dimensional code reading processing executed by the control circuit 28 after one frame of two-dimensional code 52 image and the addresses of position detection patterns 54 thereof are stored in the image memory 8 and the address memory 22 respectively is shown in the flow chart of FIG. 5. Here it will be assumed that the image has been detected distorted as shown in FIG. 6. However, in FIG. 6 the distortion is exaggerated to facilitate understanding of the following description.

When processing starts, first, processing to detect the position detection patterns 54 is carried out (S100).

In this processing, the image memory 8 and the address memory 22 are accessed and from the content stored therein it is determined whether or not there are three position detection patterns 54 and the correct center positions of the position detection patterns 54 in the image are determined. That is, in this processing, first it is determined by referencing their address values and the image in the image memory 8 whether the addresses of multiple detected position detection patterns 54 in the address memory 22 can be divided into groups of three. Also, the center positions of the position detection patterns 54 are determined from their 1 (white)/0 (black) patterns in the image memory 8 and on the basis of these determined positions it is determined whether three position detection patterns 54 are arranged at three corners of a square as shown in FIG. 2.

Then, it is determined whether or not three position detection patterns 54 have been detected in suitable positions (S110), and if they have not (NO in S110) then the CCD 4 is instructed to detect another image (S180) and processing ends.

When three position detection patterns 54 in suitable positions have been detected (YES in S110), it is determined whether or not this is a new two-dimensional code 5信 (S120). This processing is carried out to prevent a two-dimensional code 52 that has already been detected in a previous processing or before but is still being detected by the CCD 4 from being read as a new two-dimensional code. For example, when three position detection patterns 54 and the same code content have been read in the previous cycle or up to a predetermined number of cycles of the present processing previously it is deemed that the same two-dimensional code 52 is being detected again (NO in S120) and the CCD 4 is instructed to detect another image (S180) and processing ends.

When it is determined that the two-dimensional code 52 is new (YES in S120), according to the shape of each of the position detection patterns 54 a cell shape is calculated (S130). That is, first, on the basis that as shown in FIG. 3A each of the position detection patterns 54 has a shape such that the width of the black framelike square 54a is one cell, the width of the white framelike square 54b is one cell and the width of the black solid square 54c is three cells, the heights and the widths of the overall position detection patterns 54 in the image memory 8 are measured. Then, by these heights and widths being divided by seven they are made values of the height and the width of the cells in the positions of the position detection patterns 54.

Next, the positions of patterns (58A, 58B) of timing cell rows 58 running between the three position detection patterns 54 wherein white and black cells are disposed alternately are detected on the basis of the three position detection patterns 54 (54A, 54B, 54C). Then, on the basis of these timing cell row patterns 58A, 58B and the position detection patterns 54A, 54B, 54C, the positions of the cells in the data area 56 are determined (S135). That is, the cell positions of the position detection patterns 54A, 54B, 54C are determined for each of the position detection patterns 54A, 54B, 54C by dividing by the respective cell heights and widths obtained in step S130, and the cell positions of the timing cell row patterns 58A, 58B can be determined from the light-dark boundaries of those cells.

Lines drawn parallel with a line connecting the centers of the two position detection patterns 54A, 54C (and parallel with the timing cell row pattern 58B) are supposed from the cell positions of the timing cell row pattern 58A between the two position detection patterns 54A, 54B and the cell positions of the position detection patterns 54A, 54B thus obtained and lines drawn parallel with a line connecting the centers of the two position detection patterns 54A, 54B (and parallel with the timing cell row pattern 58A) are supposed from the cell positions of the timing cell row pattern 58B between the two position detection patterns 54A, 54C and the cell positions of the position detection patterns 54A, 54C. Accordingly, the intersections of these lines are taken as cell positions. In this way, the positions of the cells of the data area 56 are determined.

Next, the cells in the data area 56 of the two-dimensional code 52 are grouped with respect to the position detection patterns 54 (S140). Specifically, a line L1 passing through a position midway between the two position detection patterns 54A, 54C and parallel with the line connecting the centers of the two position detection patterns 54A, 54B is supposed. Also, a line L2 passing through a position midway between the two position detection patterns 54A, 54B and parallel with the line connecting the centers of the two position detection patterns 54A, 54C is supposed. Then, as shown in FIG. 6, the cells of the data area 56 are grouped into the four areas S1, S2, S3, S4 divided by these lines L1, L2.

Alternatively, in step S140, instead of this processing, the position of the pattern 56D of the extension pattern Cst may first be obtained and then a line L1 passing through the midway position between the position detection patterns 54A, 54C and the midway position between the position detection-pattern 54B and the pattern 56D of the extension pattern Cst supposed and a line L2 passing through the midway position between the position detection patterns 54A, 54B and the midway position between the position detection pattern 54C and the pattern 56D of the extension pattern Cst supposed and the cells of the data area 56 grouped into the four areas S1, S2, S3, S4 divided by these lines L1, L2. The position of the pattern 56D of the extension pattern Cst can be determined as that of a black cell existing at the intersection of extension lines of sides E1, E2 of the two position detection patterns 54B, 54C on the opposite sides thereof from the central position detection pattern 54A.

Next, for the cells belonging to each of these groups, on the basis of the position detection pattern 54A, 54B or 54C belonging to the respective group, using the cell shapes calculated in step 130, a reading scope, which here is a shape of a combination of pixels, is determined at the cell position of each cell included in the three areas S1, S2 and S3, and the type constituting the majority of those pixels is taken as the type of the cell (S150). For the area S4 there is no position detection pattern 54. However, for example a reading scope intermediate between those of the areas S2, S3 on either side of the area S4 may be employed. Or, when the pattern 56D of the extension pattern Cst has been obtained, a reading scope of the cells of the area S4 may be determined on the basis of the shape of this pattern 56D of the extension pattern Cst.

For example, in the example shown in FIG. 6, for the areas S1 and S2, if a cell height of three pixels and a cell width of three pixels are obtained from the respective position detection patterns 54A, 54C, a matrix of 3×3 pixels can be used as the reading scope. And for the areas S3 and S4, if a cell height of five pixels and a cell width of five pixels are obtained from the position detection pattern 54B and the pattern 56D of the extension pattern Cst, a matrix of 5×5 pixels can be used as the reading scope.

The relationship between the cell shape and the reading scope in each of the areas S1 through S4 may be that the two are exactly the same or alternatively the reading scope may be set slightly smaller than the cell shape. Considering errors between the cell shape obtained from the position detection patterns 54A, 54B, 54C or the pattern 56D of the extension pattern Cst and the cell shape in the data area 56 and errors of the cell positions, it is preferable for the reading scope to be set slightly smaller. For example, when a cell height of four pixels and a cell width of four pixels are obtained, a matrix of 3×3 pixels is preferably used as the reading scope.

When in this way the types of all the cells in the data area 56 are determined on the basis of the type of the majority of the pixels in the reading scope of each cell, the code content (data) expressed by the two-dimensional code 52 is obtained. It is then determined whether or not this code content is normal (S160). For example, it is determined whether or not the code has been read normally according to whether or not white and black cells are present in predetermined numbers or whether or not when the data expressed is 8-bit data the total comes to a predetermined number.

If the code is not normal (NO in S160), the CCD 4 is instructed to detect another image (S180) and processing ends. If the code is normal (YES in S160), processing such as outputting the code content to another device such as a host computer or storing the code content in a predetermined memory or executing processing corresponding to the code content or outputting a command corresponding to the code content is carried out (S170).

The CCD 4 is then instructed to detect another image so that a new two-dimensional code can be read (S180) and processing ends.

In the two-dimensional code reading apparatus 2 of this first preferred embodiment, the shapes of pixel combinations to be read from image data are set on the basis of cell shapes, in this case heights and widths, obtained from each of the position detection patterns 54A, 54B, 54C. As a result, even if the shapes of cells differ according to their position because the shape of the two-dimensional code 52 detected by the CCD 4 is distorted, it is possible to set suitable reading scopes for the cells corresponding to those differences in shape. Also, since the type of each cell is determined according to the type of the majority of pixels in the reading scope of the cell, the content of the data expressed by the two-dimensional code can be read correctly.

In this first preferred embodiment, in step S130, as parameters specifying a cell shape, a cell height and a cell width are obtained; however, the height and the width of a cell can also be taken as expressing the area (height×width) of the cell, i.e. its size. Therefore, in step S150, a reading scope may alternatively be determined using the cell area (height×width) as a parameter. For example, if the area of a cell is nine pixels, the reading scope may be made 3×3 pixels. Also, when the reading scope is to be made smaller than the cell area, if the cell area is twelve pixels, 3×3 pixels may be made the reading scope.

Figure 17:
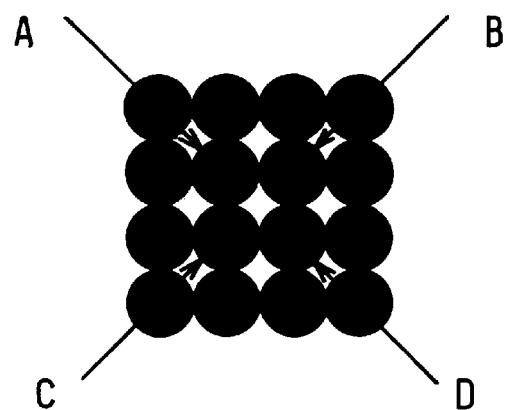
FIG. 17 is a view showing a cell in which the number of pixels in a reading scope is an even number.

Although the cell composed of odd number pixels like 9(3×3) or 25(5×5) has been described in the first embodiment, the cell may be composed of even number pixels. For example, a cell including 16(4×4) pixels is shown in FIG. 17. In this case, either of pixels A to D close to the center of the cell is previously set as a center pixel. A scope of 4×4 is set on the basis of the center pixel and white/black/type determination is made with respect to all the pixels in this scope. It is to be noted that when the pixel's number is an even number there can be a case wherein the number of white pixels is the same as the number of black pixels. In this case, the type of cell may be determined to be a preset one between white and black.

Figure 18:
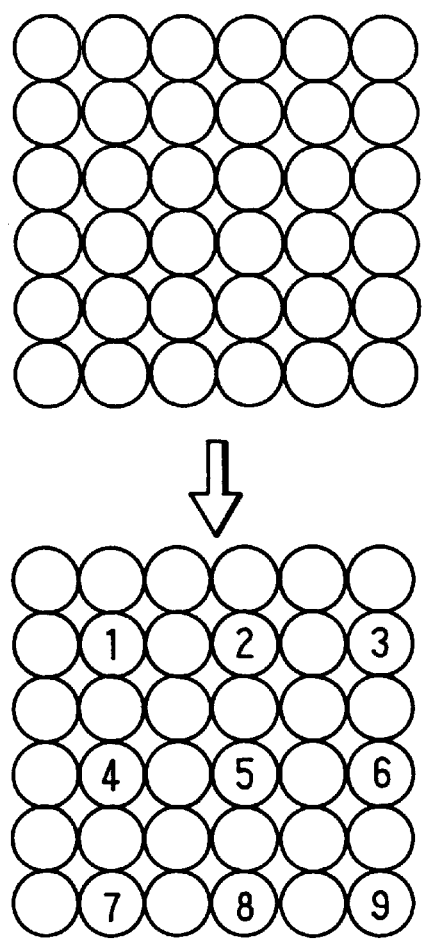
FIG. 18 is view showing pixel positions of a cell where black/white determination is carried out when the cell has a large number of pixels in the reading scope.

Further, although white/black type determination was made with respect to all the pixels in the reading scope, if the cell has a large number of pixels, the white/black type determination may be made only with respect to pixels located at predetermined positions in the cell. For example, in a case where the reading scope is changed from 3×3 to 5×5 in response to increase in pixel's number as shown in FIG. 18, the white/black type determination is made not with respect to all the 25(5×5) pixels, but rather with respect to one-skipped 9 pixels in 25 pixels.

Also, as the cell shape, instead of using just a height and a width, angles of corners of four-cornered shapes which can specify shapes such as trapezoids and parallelograms may be added to the parameters. Reading processing may then be carried out with reading scopes set to the same shapes as cell shapes specified by these parameters, or reading processing may be carried out with reading scopes set to similar but smaller shapes.

Although in this first preferred embodiment the cell reading scopes were determined group by group, reading scopes of cells may alternatively be set with respect to cell areas or shapes obtained on the basis of the position detection patterns 54A, 54B, 54C in correspondence with the distance of the cells from the position detection patterns 54A, 54B, 54C. For example, for cells lying midway between the two position detection patterns 54A, 54B, a reading scope may be determined using as a reference an area or shape intermediate between cell areas or shapes obtained on the basis of the respective position detection patterns 54A, 54B. Then, areas or shapes of cells may be so obtained by proportional calculation that the closer a cell is to either of the position detection patterns the closer the calculated area or shape of the cell is to a cell area or shape determined on the basis of the respective position detection patterns. And when using all three of the position detection patterns 54A, 54B, 54C, or when the pattern 56D of the extension pattern Cst is also included, reading scopes can be determined by similar proportional calculations apportioning areas or shapes to cells according to their distances from the position detection patterns and the extension pattern in two dimensions.

A second preferred embodiment of the invention will now be described. The configuration of the second preferred embodiment is the same as that of the first preferred embodiment shown in FIG. 1 and therefore will not be described in the following.

Figure 7:
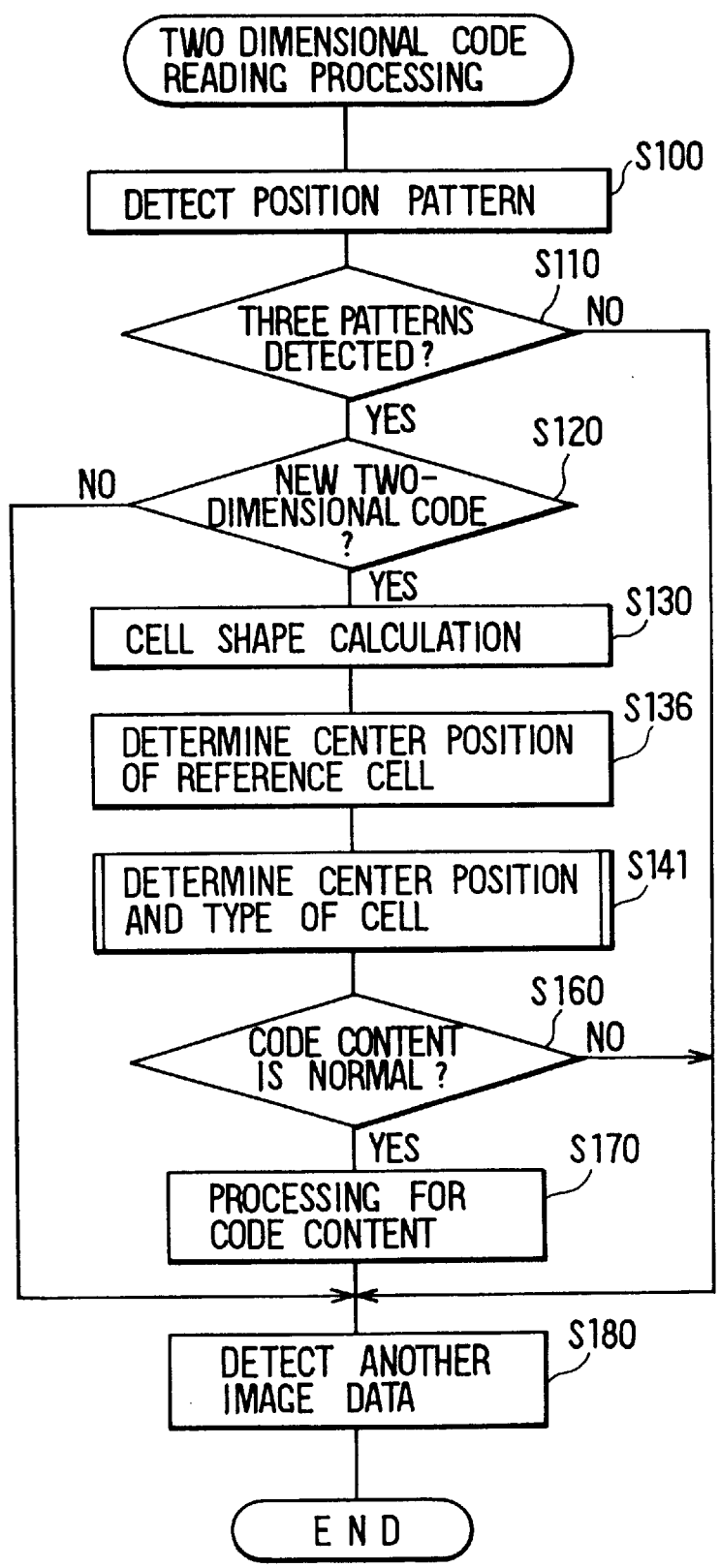
FIG. 7 is a flow chart of two-dimensional code reading processing carried out by a two-dimensional code reading apparatus according to a second preferred embodiment of the present invention.

A flow chart of two-dimensional code reading processing carried out in this second preferred embodiment is shown in FIG. 7. Again, it will be assumed that the image has been detected distorted as shown in FIG. 6. In FIG. 6, to make the drawing clearer, the black/white types of cells other than those of the position detection patterns 54A, 54B, 54C and the timing cell patterns 58A, 58B and the pattern 56D of the extension pattern Cst are not shown.

When processing starts, processing to detect the position detection patterns 54A, 54B, 54C is carried out (S100).

It is then determined (S110) whether or not three suitable position detection patterns 54A, 54B, 54C have been detected in step S100, and if they have not (NO in S110) the CCD 4 is instructed to detect another image (S180) and processing ends.

When three suitable position detection patterns 54A, 54B, 54C have been detected (YES in S110), it is determined whether or not it is a new two-dimensional code 52 (S120).

When it is determined to be a new two-dimensional code 52 (YES in S120), cell shapes are calculated according to the shapes of the position detection patterns 54A, 54B, 54C (S130). That is, values of a cell height Wy and a cell width Wx for each of the three position detection patterns 54A, 54B, 54C are obtained.

The processing of steps S100 to S130 is the same as that described in the first preferred embodiment.

Figure 10:
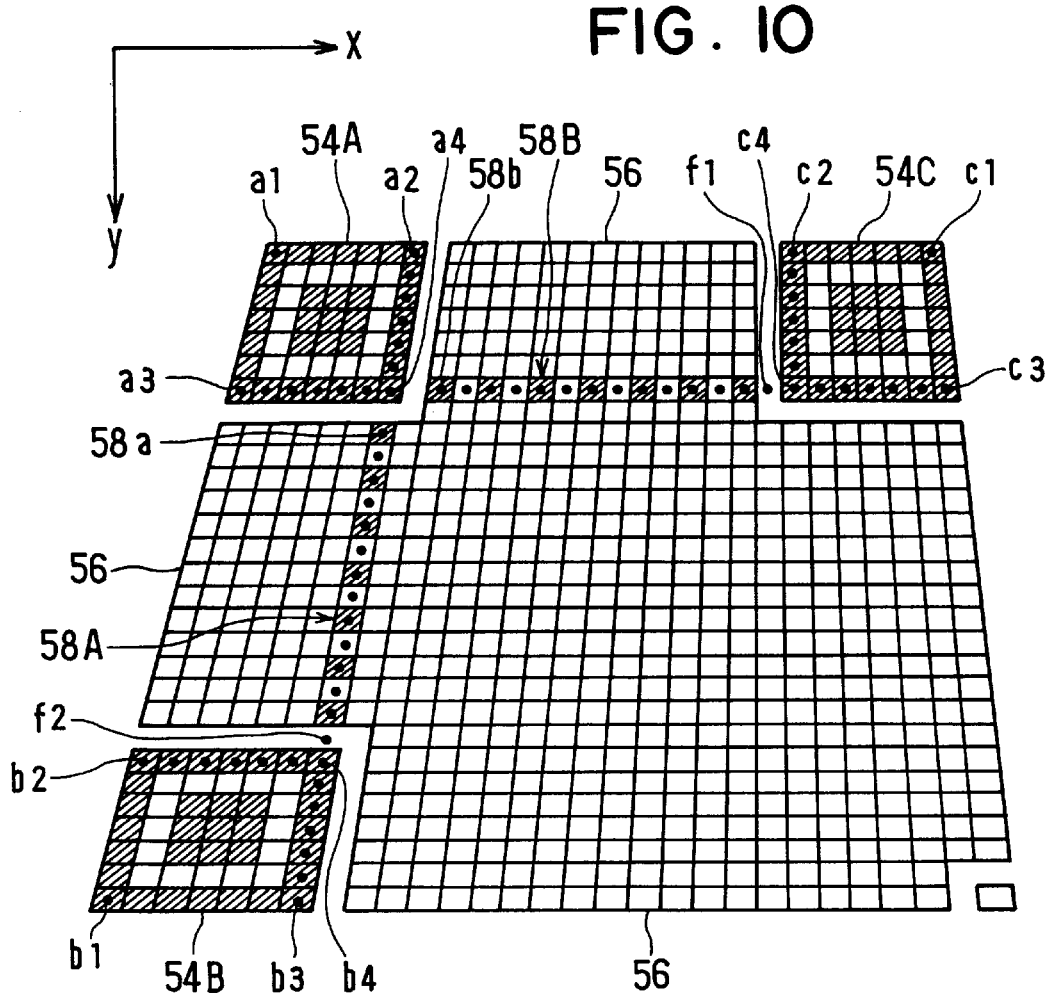
FIG. 10 is a view illustrating an image of a two-dimensional code.

Next, on the basis of the cell height Wy and the cell width Wx in each of the position detection patterns 54A, 54B, 54C thus obtained, as shown in a view illustrating an image of a two-dimensional code 52 of FIG. 10, center positions of reference cells are determined (S136) to determine the positions of the other cells. That is, first, since the external shapes of are known and the cell height Wy and the cell width Wx at the position of each of the position detection patterns 54A, 54B, 54C are obtained, by obtaining positions half of the cell height and half of the cell width inward of edges of the position detection patterns 54A, 54B, 54C, the center positions of the four corner cells a1, a2, a3, a4, b1, b2, b3, b4, c1, c2, c3, c4 of the black framelike square 54a of each of the three position detection patterns 54A, 54B, 54C are determined.

With respect to the position detection pattern 54A, by dividing the distance between the center positions of the corner cell a2 and the corner cell a4 into six equal parts, the center positions of the cells between the corner cell a2 and the corner cell a4 are determined. Similarly, by dividing the distance between the corner cell a3 and the corner cell a4 into six equal parts, the center positions of the cells between the corner cell a3 and the corner cell a4 are determined. And similarly with respect to the other position detection patterns 54B, 54C, the center positions of the cells between the corner cell b2 and the corner cell b4, the center positions of the cells between the corner cell b3 and the corner cell b4, the center positions of the cells between the corner cell c2 and the corner cell c4, and the center positions of the cells between the corner cell c3 and the corner cell c4 are determined.

Then, the center positions of the cells of the two timing cell row patterns 58A, 58B wherein white and black cells are disposed alternately running between the three position detection patterns 54A, 54B, 54C are determined by measuring the light-dark boundaries of the cells and the sizes of the white and black cells between the corner cell a4 and the corner cell c4 and between the corner cell a4 and the corner cell b4 of the position detection patterns 54A, 54B, 54C.

Then, with the cells in the timing cell row patterns 58A, 58B and the position detection patterns 54A, 54B, 54C whose center positions have thus been determined as reference cells, on the basis of their center positions, the center positions of the other cells, i.e. the cells in the data area 56, are determined. From the pixels in the vicinities of those center positions the types of those cells are determined (S141).

Figure 8:
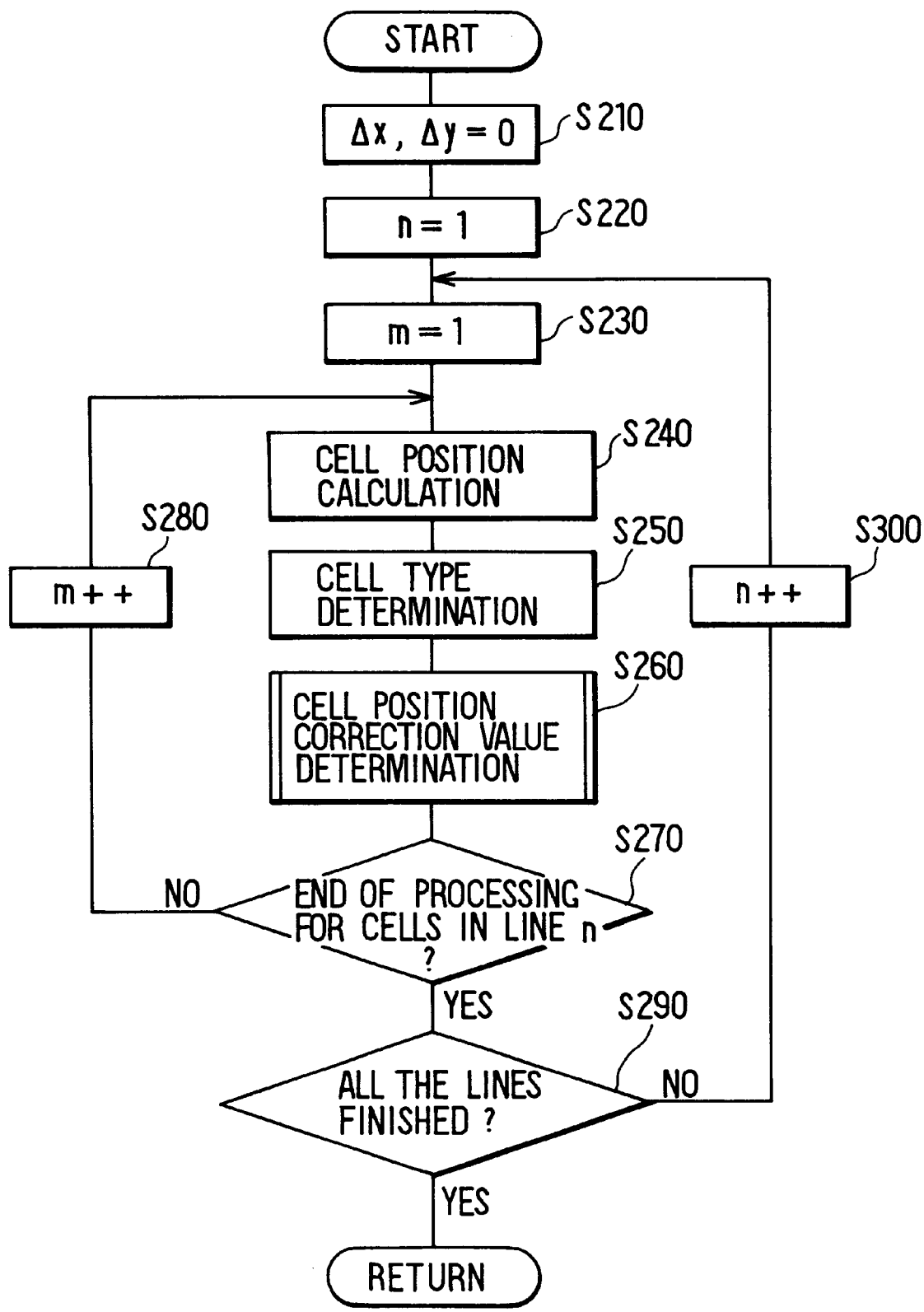
FIG. 8 is a flow chart of cell position determination and cell type determination processing carried out by the two-dimensional code reading apparatus of the second preferred embodiment.

The details of step S141 are shown in the flow chart of FIG. 8.

Figure 12:
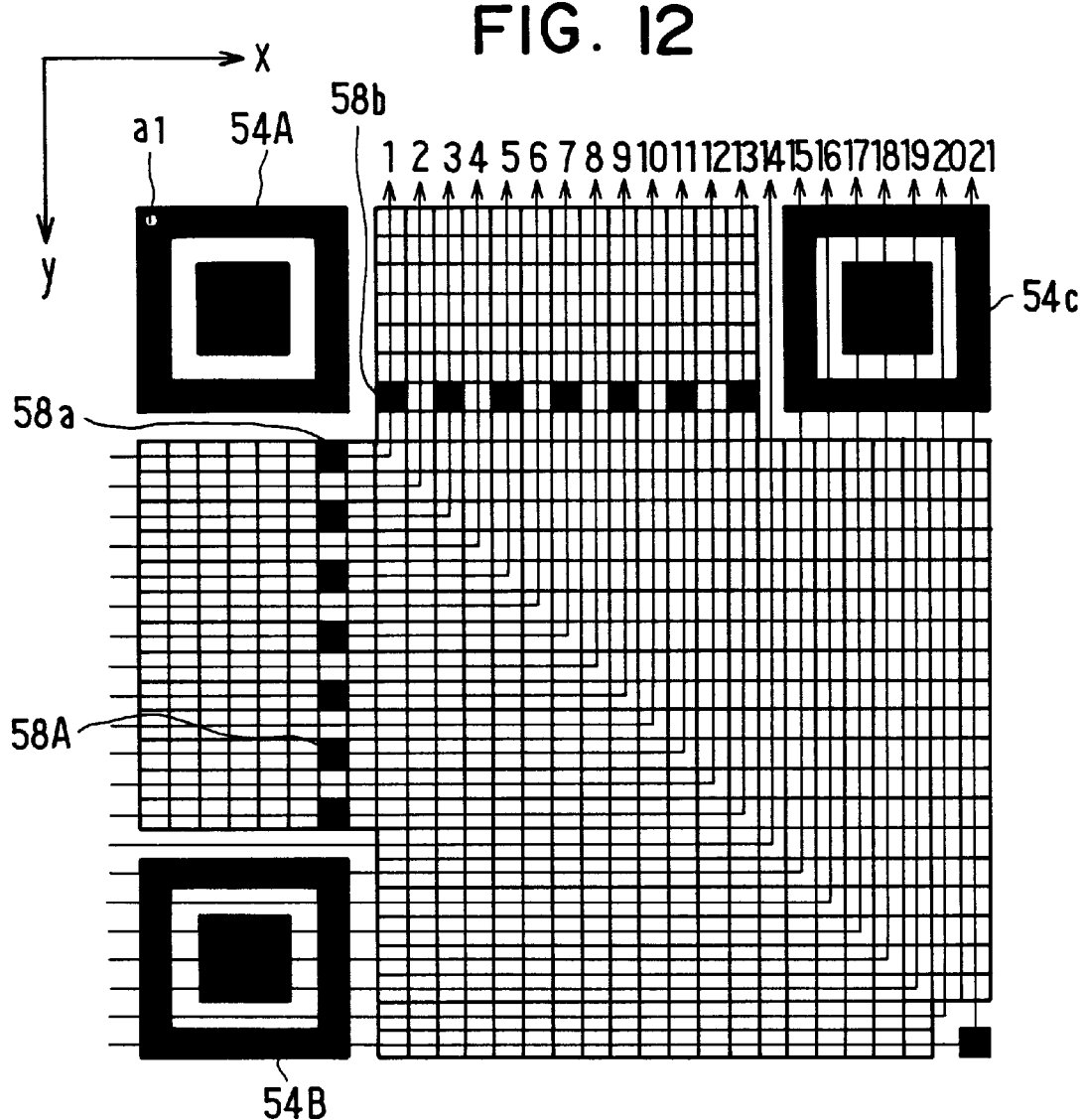
FIG. 12 is a view illustrating an order of cell processing.

First, cell position corrections $\Delta x$, $\Delta y$ are cleared (S210). Then, the line number n of cells to be processed is set to 1 (S220). As shown in FIG. 12, line numbers are assigned to L-shaped lines of cells in order toward the lower right of the figure from a line 1 adjacent to the lower side and the right side of the position detection pattern 54A at the upper left of the figure. Specifically, there are lines 1 through 21.

A cell number m in the line n is then set to 1 (S230). This cell number m is set in each line to increase from the left end of line in the figure toward the upper end. Then, an x-coordinate xp and a y-coordinate yp of the position of the mth cell of line n are calculated according to the following equations (S240).

$$xp = xt + \Delta x \quad yp = yt + \Delta y \qquad (1)$$

Here, the computed x-coordinate xt and the computed y-coordinate yt can be obtained in the following way.

Taking line 1 as an example, first, for the cell row portion of line 1 extending in the x-direction, from the y-coordinate of the center position of the uppermost cell 58a of the timing cell row pattern 58A extending in the vertical direction (the y-direction), considering the inclination of the image of the two-dimensional code 52 with respect to the x-direction, a computed y-coordinate yt can be obtained. Also, from the x-coordinates of the center positions of the corner cell a3 through the corner cell a4 of the position detection pattern 54A, considering the inclination of the image of the two-dimensional code 52 with respect to the y-direction, a computed x-coordinate xt can be obtained.

For the cell row portion of line 1 extending in the y-direction, from the x-coordinate of the center position of the leftmost cell 58b of the timing cell line pattern 58B extending in the horizontal direction (the x-direction), considering the inclination of the image of the two-dimensional code 52 with respect to the y-direction, a computed x-coordinate xt can be obtained. Also, from the y-coordinates of the center positions of the cells from the corner cell a2 through the corner cell a4 of the position detection pattern 54A, considering the inclination of the image of the two-dimensional code 52 with respect to the x-direction, a computed y-coordinate yt can be obtained.

The inclination of the image of the two-dimensional code 52 with respect to the x-direction (the inclination of the cell row portion extending in the x-direction) can be obtained as the inclination of a line connecting the corner cell a3 and the corner cell a4 of the position detection pattern 54A, and the inclination of the image of the two-dimensional code 52 with respect to the y-direction (the inclination of the cell row portion extending in the y-direction) can be obtained as the inclination of a line connecting the corner cell a2 and the corner cell a4 of the position detection pattern 54A.

Figure 11A:
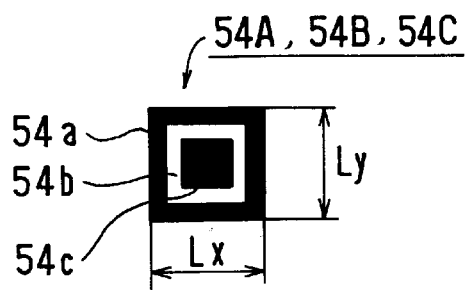
FIGS. 11A and 11B are views illustrating determination of cell size and image distortion from a position detection pattern.
Figure 11B:
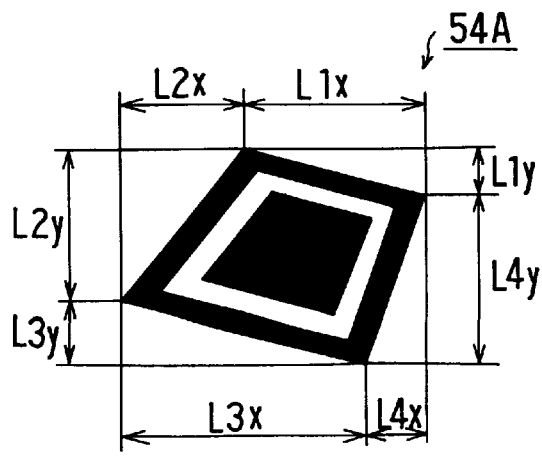

As the method for considering the inclination of the image of the two-dimensional code 52, besides this, for example, assuming that an image of the position detection pattern 54A is obtained as shown in FIG. 11B, it is possible to calculate using parameters Wxx, Wxy (Wxx being an increase value in the x-coordinate of when the cell position proceeds in the plus direction of the x-coordinate and Wxy being an increase value in the y-coordinate of when the cell position proceeds in the plus direction of the x-coordinate) expressing the inclination of the cell row portion of each line extending in the x-direction and parameters Wyx, Wyy (Wyx being an increase value in the x-coordinate of when the cell position proceeds in the plus direction of the y-coordinate and Wyy being an increase value in the y-coordinate of when the cell position proceeds in the plus direction of the y-coordinate) expressing the inclination of the cell row portion of each line extending in the y-direction.

$$Wxx=(L1x+L3x)/(2\times 7) \; Wxy=(L1y+L3y)/(2\times 7) \; Wyx=(L2x+L4x)/(2\times 7) \; Wyy=(L2y+L4y)/(2\times 7) \qquad (2)$$

For the other lines also, it is possible to obtain a computed x-coordinate xt and a computed y-coordinate yt using the center positions of the reference cells of the position detection patterns 54A, 54B, 54C and an intermediate position f1 between the timing cell line pattern 58B and the corner cell c4 and an intermediate position f2 between the timing cell line pattern 58A and the corner cell b4.

By obtaining a computed x-coordinate xt and a computed y-coordinate yt in this way and correcting the x-coordinate xt and the y-coordinate yt with center position corrections $\Delta x$, $\Delta y$ respectively using the above equations, center positions (xp, yp) at which reading is actually carried out are determined. Then, the image at the center position of the cell calculated in step S240 is read and the black/white type of the cell is determined (S250). For example, if the majority of a predetermined number of pixels at the center position of the cell are black the cell is determined to be black and if white pixels are the majority then the cell is determined to be white.

Figure 9:
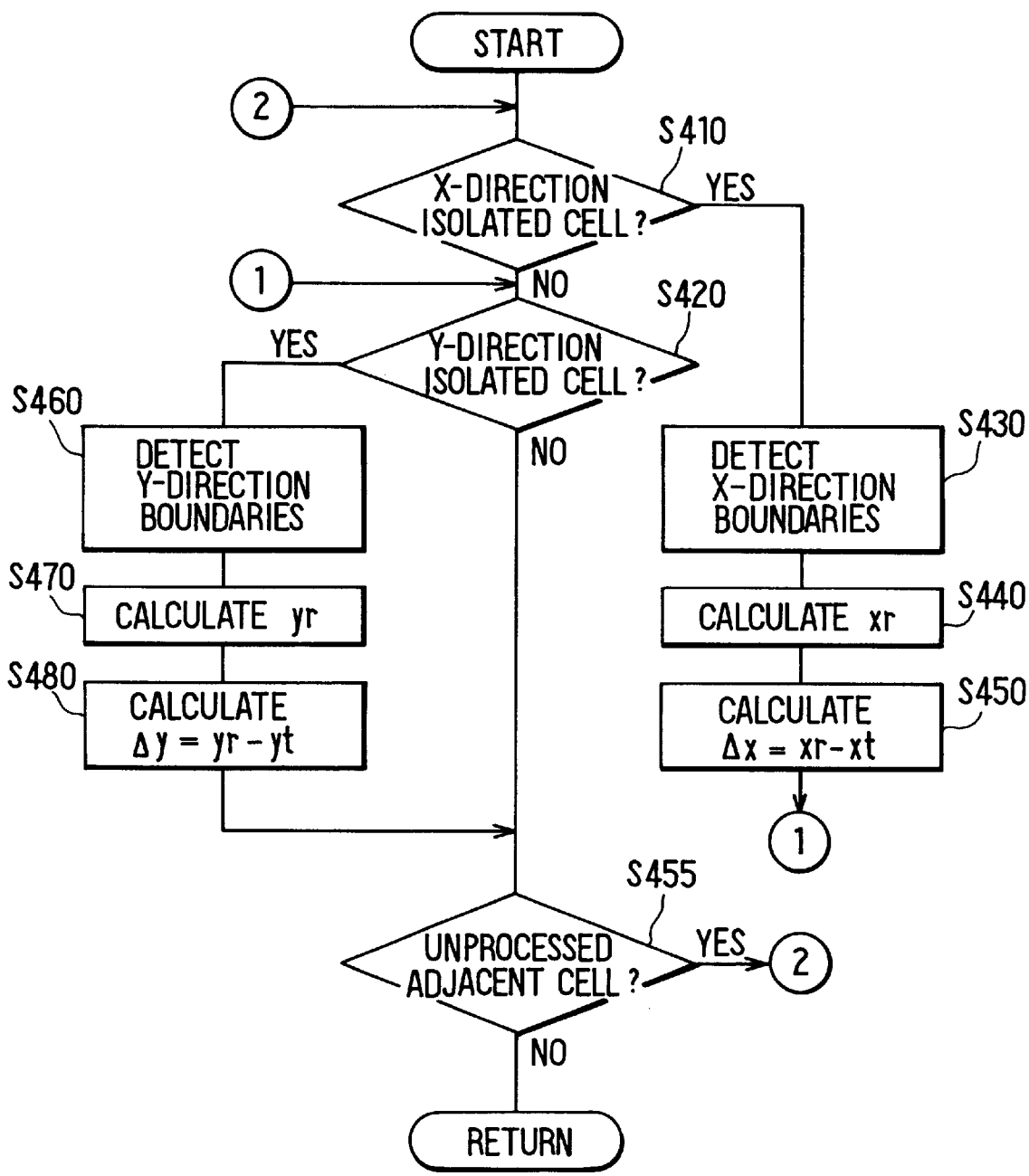
FIG. 9 is a flow chart of cell position correction value determination processing carried out by the two-dimensional code reading apparatus of the second preferred embodiment.

Next, cell position correction value determination processing is carried out (S260). This processing sets suitable correction values to the cell position corrections $\Delta x$, $\Delta y$ cleared in step S210. The details of this processing are shown in the flow chart of FIG. 9.

First, a determination (S410) of whether or not among the cells adjacent to the cell whose type was determined in step S250 there is an x-direction isolated cell is carried out. When in this determination it is determined that there is no x-direction isolated cell (NO in S410) a determination (S420) of whether or not there is a y-direction isolated cell is carried out.

Figure 13A:
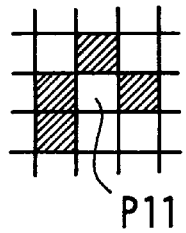
FIGS. 13A through 13C are views illustrating types of isolated cell.
Figure 13B:
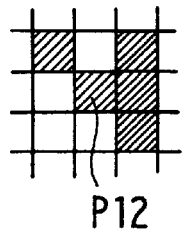
Figure 13C:
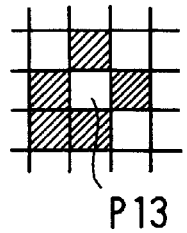
Figure 14A:
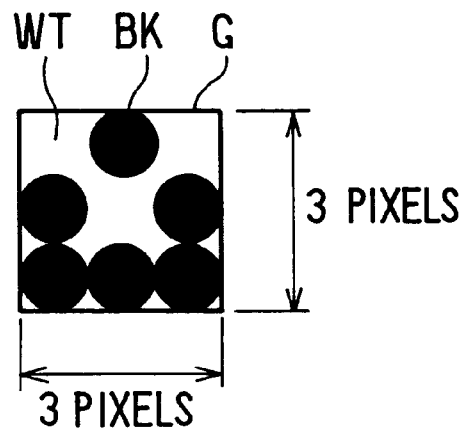
FIG. 14A is a view illustrating processing for determining the type of a cell.
Figure 14B:
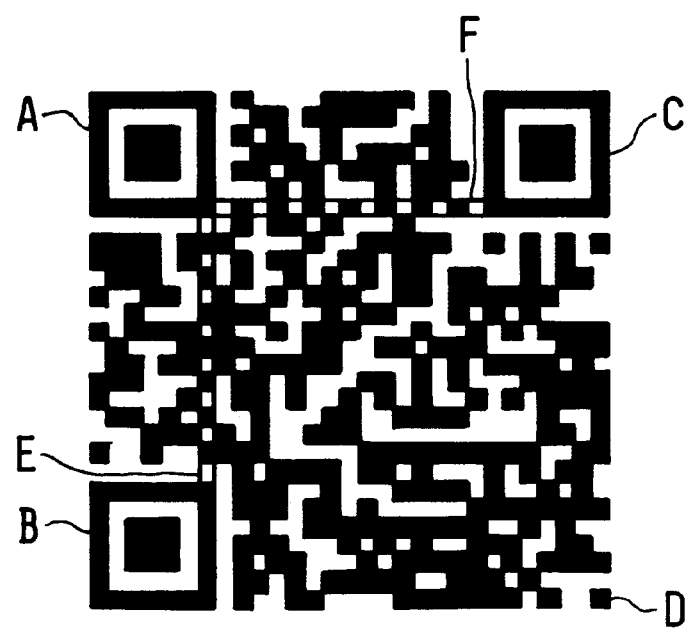
FIG. 14B is a view illustrating the makeup of a two-dimensional code.
Figure 15:
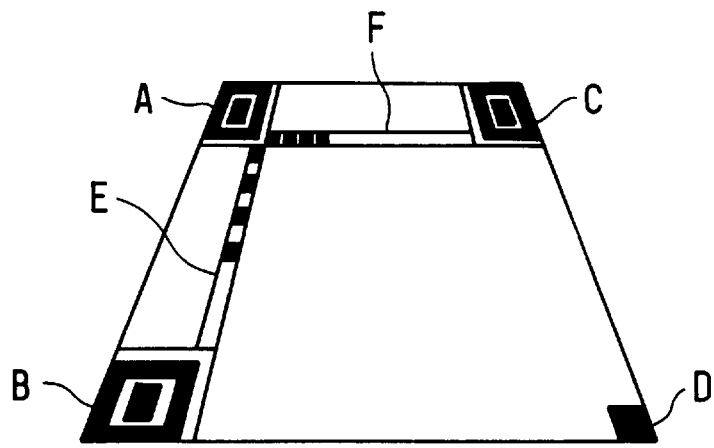
FIG. 15 is a view illustrating distortion in an image of a two-dimensional code.
Figure 16A:
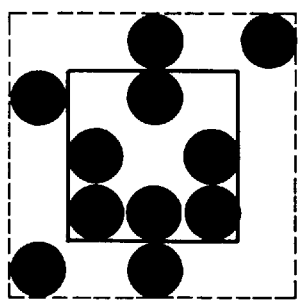
FIGS. 16A and 16B is a view showing a cell whose determined type differs depending on a reading scope.
Figure 16B:
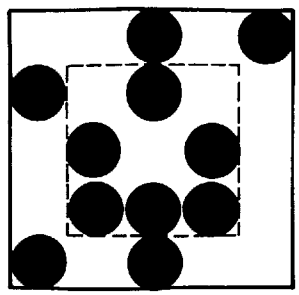

Here, an isolated cell means a cell whose type is different from the cells above and below it or to the left and right of it, as shown in FIGS. 13A through 13C. In FIG. 13A, because the cell p11 is white and the cells to the left and right of it are both black it is an isolated cell in the x-direction (the horizontal direction). In the case shown in FIG. 13B, because the cell p12 is black and the cells above and below it are both white it is an isolated cell in the y-direction (the vertical direction). In the case shown in FIG. 13C, the cell p13 is white and the four cells above and below and to the left and right of it are black and therefore it is an isolated cell in both the x-direction (the horizontal direction) and the y-direction (the vertical direction).

Since the determination of whether or not there is an isolated cell becomes possible when the types of the cells around a cell, that is, at least the types of the cells above and below it and to the left and right of it, become known, the determination is not carried out for the cell whose type was determined in the immediately preceding step S250 itself but rather is carried out for a cell whose type was determined previously and for which the types of both the cells above and below or to the left and right of it become known as a result of the type of the new cell being determined in the immediately preceding step S250. In practice, the object of the determination is the adjacent cell whose type was determined one time before or the adjacent cell in the previous line.

When the determination is made for such a cell and the cell is determined to be neither an x-direction isolated cell nor a y-direction isolated cell, the determinations of steps S410 and S420 are both 'NO' and processing shifts to step S455.

When it is an x-direction isolated cell (YES in S410), the positions of the boundaries between that isolated cell and the cells adjacent thereto in the x-direction are detected from the image data (S430). In this case, because the cell type of the cells adjacent in the x-direction is different from that of the isolated cell, it is possible to determine the boundary positions easily by checking the black/white boundaries of the image data.

The x-coordinate xr of the midway point between the positions of the two boundaries with the cells adjacent in the x-direction is then calculated (S440). The value of this xr is not a value obtained by calculation on the basis of the timing cell row patterns 58A, 58B and the position detection patterns 54A, 54B, 54C, but rather shows the actual x-coordinate of the isolated cell in the image data. Then, according to the following equation, the difference between the actual x-coordinate xr and the computed x-coordinate xt of the cell position obtained in step S240 is calculated and this value is taken as $\Delta x$ (S450).

$$\Delta x = xr - xt \quad (3)$$

Then, for the same cell, it is determined whether or not it is a y-direction isolated cell (S420). This is to process cases wherein as shown in FIG. 13C the cell is an isolated cell in both the x-direction and the y-direction. When the cell is not isolated in the y-direction (NO in S420), processing proceeds to step S455. When the cell is also a y-direction isolated cell (YES in S420), the positions of the boundaries between that isolated cell and the cells adjacent thereto in the y-direction are determined from the image data (S460). In this case also, because the cell type of the cells adjacent in the y-direction is different from that of the isolated cell, it is possible to determine the boundary positions easily by checking the black/white boundaries of the image data.

The y-coordinate yr of the midway point between the positions of the two boundaries with the cells adjacent in the y-direction is then calculated (S470). The value of this yr is not a value obtained by calculation on the basis of the timing cell row patterns 58A, 58B and the position detection patterns 54A, 54B, 54C, but rather shows the actual y-coordinate of the isolated cell in the image data.

Then, according to the following equation, the difference between the actual y-coordinate yr and the computed y-coordinate yt of the cell position obtained in step S240 is calculated and this value is taken as $\Delta y$ (S480).

$$\Delta y = yr - yt \quad (4)$$

After step S480, it is determined whether or not there are no adjacent cells for which the present processing has not yet been carried out, and if there is an unprocessed adjacent cell (YES in S455) the present processing is carried out again from the determination of step S410 for that unprocessed adjacent cell.

In this way, if an isolated cell exists, cell position correction values $\Delta x$, $\Delta y$ are newly set and used to correct the cell position on the basis of the equations shown in step S240.

When processing of all of the adjacent cells ends (NO in S455), cell position correction value determination processing (S260) ends and it is then determined whether or not processing has ended for all of the cells in line n (S270). If there is still an unprocessed cell in line n (NO in S270), the cell number is incremented (S280) and the next cell is thereby specified and the processing is carried out again from step S240. If processing has ended for all of the cells in line n (YES in S270), it is then determined whether or not all the lines are finished (S290). Specifically, when processing for the line 21 has not been carried out, because an unprocessed line exists (NO in S290), the line number is incremented (S300) and the next line is specified and the processing is carried out again from step S230.

When in this way processing is finished for all of the lines (YES in S290), the positions and the types of all the cells of the two-dimensional code 52 have been determined and the code content expressed by the two-dimensional code 52 is obtained.

It is then determined whether or not the code content is normal (S160). If the code is not normal (NO in S160), the CCD 4 is instructed to detect another image (S180) and processing ends. If the code is normal (YES in S160), processing such as outputting the code content to another device such as a host computer or storing the code content in a predetermined memory or executing processing corresponding to the code content or outputting a command corresponding to the code content is carried out (S170). The CCD 4 is then instructed to detect another image so that a new two-dimensional code can be read (S180) and processing ends.

As described above, to read the contents of cells, the two-dimensional code reading apparatus 2 of this second preferred embodiment does not use mere computed cell positions (x-coordinate xt, y-coordinate yt) but rather uses positions corrected by correction values $\Delta x$, $\Delta y$, as shown in S240. These correction values $\Delta x$, $\Delta y$ are values obtained from the difference between the actual position and the computed cell position (x-coordinate xt, y-coordinate yt) of an isolated cell each time an isolated cell appears. The values of these correction values $\Delta x$, $\Delta y$ are maintained after an isolated cell appears until the appearance of the next isolated cell. As a result, it is possible to constantly correct deviation between computed center positions and actual cell positions and read the contents of cells from correct center positions.

Furthermore, because the processing of cell position determination and cell content reading starts from the vicinity of the position detection pattern 54A, which has the position detection patterns 54B, 54C on either side of it, initially there is almost no positional deviation. Also, because in the course of moving away from the position detection pattern 54A whenever an isolated cell appears the positional deviation with that isolated cell is held as the correction values $\Delta x$, $\Delta y$ and used to correct the reading positions of cells until the next isolated cell appears, even in cell positions far from the position detection patterns 54A, 54B, 54C and the timing cell patterns 58A, 58B accuracy of the cell positions is always maintained and it is possible to read the cell contents of the entire two-dimensional code 52 correctly.

In practice the isolated cells shown in FIGS. 13A through 13C exist in the two-dimensional code 52 in extremely large numbers. Also, it is possible to apply a masking process so as to guarantee that isolated cells are present in large numbers; therefore, the intervals between appearances of isolated cells are very short. Therefore, by means of the cell position determination processing described above it is possible to determine extremely accurate cell positions.

In this second preferred embodiment, reading of the contents of the cells was carried out in a sequence forming an L-shape, as shown in FIG. 12; however, lines of cells aligned in the x-direction may be processed from left to right in order from a top line to a bottom line. Or, lines of cells aligned in the y-direction may be processed from top to bottom in order from a leftmost line to a rightmost line.

Also, although in this second preferred embodiment only the center positions of the cells are corrected, if every time an isolated cell appears the difference between the height or the width of that isolated cell and the height or the width of a reference cell determined based on the position detection patterns 54A, 54B, 54C is held as a separate, second correction value and used in obtaining subsequent computed coordinates, because it is possible to keep deviation of the computed center positions of cells small and the correction values $\Delta x$, $\Delta y$ cannot somehow become large, the detection of positions of isolated cells by image processing also becomes more accurate. Or alternatively, instead of calculating a second correction value, when an isolated cell appears, the height or width of the isolated cell may be used in place of the height or width of the reference cell.

What is claimed is:

1. A two-dimensional code reading apparatus for reading a two-dimensional code wherein binary code data is expressed as a pattern of black and white cells in a two-dimensional matrix, comprising:
    a two-dimensional image detecting device for detecting a two-dimensional image of said two-dimensional code;
    a reference position determining device for determining a reference position where each cell constituting a pattern of a predetermined shape lies in said two-dimensional image detected by said two-dimensional image detecting device on the basis of a pattern of said pattern having said predetermined shape;
    a cell size determining device for determining a size of a cell in said two-dimensional code from said pattern of said pattern said predetermined shape;
    a cell position calculating device for calculating a position of each of cells from said reference position determined by said reference position determining device on the basis of said cell size determined by said cell size determining device;
    a cell reading device for determining a type of a cell at a cell position calculated by said cell position calculating device;
    an isolated cell distinguishing device for distinguishing whether or not a cell of which type has been determined is an isolated cell;
    an actual position determining device for determining an actual position of the isolated cell on the basis of the two-dimensional image of the isolated cell, when said isolated cell distinguishing device distinguishes that the cell is the isolated cell;
    a cell position correction value calculating device for calculating a correction value for correcting a calculated cell position from a difference between said calculated position and said actual position of said isolated cell; and
    a cell position correcting device for correcting said cell position calculated by said cell position calculating device by using said correction value calculated by said cell position correction value calculating device.

2. A two-dimensional code reading apparatus according to claim 1, wherein said isolated cell a cell sandwiched in an x-direction or a y-direction between cells of an opposite type.

3. A two-dimensional code reading apparatus according to claim 1, wherein said isolated cell a cell sandwiched in an x-direction and a y-direction between cells of an opposite type.

4. A two-dimensional code reading apparatus according to claim 1, wherein said pattern of said predetermined shape includes a position detection pattern consisting of a pattern from which the same frequency component ratios can be obtained with a scan line crossing a center of said pattern irrespective of an angle of said scan line, said position detection pattern being disposed in each of at least two predetermined positions in said two-dimensional code.

5. A two-dimensional code reading apparatus according to claim 4, wherein said pattern of said predetermined shape includes rows of timing cells running between said position detection patterns, wherein cells of opposite types are disposed alternately.

6. A two-dimensional code reading apparatus according to claim 4, wherein said position detection patterns exist at three of corners of a matrix of said two-dimensional code and said cell position determining device determines cell positions starting from cells around the position detection pattern having other position detection patterns on either side of it.

7. A two-dimensional code reading apparatus according to claim 1, further comprising a storing medium which stores a computer program for realizing functions of a plurality of devices.

8. A two-dimensional code reading apparatus according to claim 1, further comprising:
    a reading control device for when a content of a cell is to be read from said two-dimensional image adjusting a size of a reading scope from which the content of the cell is to be read with respect to a cell size obtained by said cell size determining device according to a distance of the cell from said pattern;
    wherein said cell reading device reads a content of a cell in said reading scope adjusted by said reading control device.

9. A two-dimensional code reading apparatus according to claim 8, wherein said reading scope adjusted by the reading control device is set smaller than said cell size obtained by said cell size determining device.

10. A two-dimensional code reading apparatus according to claim 8, wherein said cell reading device reads for each pixel included in said reading scope whether a type of a pixel is black or white, and a type of pixels constituting a majority of all the pixels included in said reading scope is determined to be a type of a cell.

11. A two-dimensional code reading apparatus according to claim 8, wherein said cell reading device reads for pixels located at predetermined positions in said reading scope whether a type of a pixel is black or white, and determines a type of a cell on the basis of a difference between a number of white pixels and a number of black pixels.

12. A two-dimensional code reading apparatus according to claim 8, wherein said pattern of a predetermined shape includes a plurality of patterns located at different positions, said cell size determining device determines a plurality of cell sizes in said two-dimensional image on the basis of each of said plurality of patterns, and said reading control device adjusts said reading scope on the basis of distances of the cell from each of said plurality of patterns and said plurality of cell sizes determined from each of said plurality of patterns.

13. A two-dimensional code reading apparatus according to claim 1, further comprising:
    a cell grouping device for grouping cells of said two-dimensional code in said two-dimensional image with a position of said pattern as a reference; and
    a reading control device for when cells are to be read from said two-dimensional image adjusting for each group of cells formed by said cell grouping device a size of a reading scope from which a content of each of the cells in a group is to be read with respect to a cell size determined by said cell size determining device;

wherein said cell reading device reads a content of the cell in said reading scope adjusted group by group by said reading control device.

14. A two-dimensional code reading apparatus according to claim 13, wherein said reading scope adjusted by the reading control device is set smaller than said cell size determined by said cell size determining device.

15. A two-dimensional code reading apparatus according to claim 13, wherein said cell reading device reads for each pixel included in said reading scope whether a type of a pixel is black or white, and a type of pixels constituting a majority of all the pixels included in said reading scope is determined to be a type of a cell.

16. A two-dimensional code reading apparatus according to claim 13, wherein said cell reading device reads for pixels located at predetermined positions in said reading scope whether a type of a pixel is black or white, and determines a type of a cell on the basis of a difference between a number of white pixels and a number of black pixels.

17. A two-dimensional code reading apparatus according to claim 13, wherein said pattern of a predetermined shape includes a plurality of patterns located at different positions, said cell size determining device determines a plurality of cell sizes in said two-dimensional image on the basis of each of said plurality of patterns, and said reading control device adjusts for each group of cells said reading scope so that said reading scope for cells in a group is determined on the basis of said cell size determined from said pattern belonging to said group.

18. A two-dimensional code reading apparatus according to claim 1, further comprising:

a reading control device for when a content of a cell is to be read from said two-dimensional image adjusting a shape of a reading scope from which the content of the cell is to be read with respect to a cell size determined by said cell size determining device according to a distance of the cell from said pattern, wherein said cell reading device reads the content of the cell from said reading scope adjusted by said reading control device.

19. A two-dimensional code reading apparatus according to claim 18, wherein said reading scope adjusted by the reading control device is set smaller than said cell size determined by said cell size determining device.

20. A two-dimensional code reading apparatus according to claim 18, wherein said cell reading device reads for each pixel included in said reading scope whether a type of a pixel is black or white, and a type of pixels constituting a majority of all the pixels included in said reading scope is determined to be a type of a cell.

21. A two-dimensional code reading apparatus according to claim 18, wherein said cell reading device reads for pixels located at predetermined positions in said reading scope whether a type of a pixel is black or white, and determines a type of a cell on the basis of a difference between a number of white pixels and a number of black pixels.

22. A two-dimensional code reading apparatus according to claim 18, wherein said pattern of a predetermined shape includes a plurality of patterns located at different positions, said cell size determining device determines a plurality of cell sizes in said two-dimensional image on the basis of each of said plurality of patterns, and said reading control device adjusts said reading scope on the basis of distances of the cell from each of said plurality of patterns and said plurality of cell sizes calculated from each of said plurality of patterns.

23. A two-dimensional code reading apparatus according to claim 18, wherein said cell shape is specified by its width, its height, and angles at four corners of said cell.

24. A two-dimensional code reading apparatus according to claim 1, further comprising:

a cell grouping device for grouping cells of said two-dimensional code in said two-dimensional image with a position of said pattern as a reference; and a reading control device for when contents of cells are to be read from said two-dimensional image adjusting for each group of cells formed by said cell grouping device a shape of a reading scope from which the content of each of the cells in a group is to be read with respect to a cell size determined by said cell size determining device;

wherein said cell reading device reads the content of the cell from said reading scope adjusted group by group by said reading control device.

25. A two-dimensional code reading apparatus according to claim 24, wherein said reading scope adjusted by the reading control device is set smaller than said cell size determined by said cell size determining device.

26. A two-dimensional code reading apparatus according to claim 24, wherein said cell reading device reads for each pixel included in said reading scope whether a type of a pixel is black or white, and a type of pixels constituting a majority of all the pixels included in said reading scope is determined to be a type of a cell.

27. A two-dimensional code reading apparatus according to claim 24, wherein said cell reading device reads for pixels located at predetermined positions in said reading scope whether a type of a pixel is black or white, and determines a type of a cell on the basis of a difference between a number of white pixels and a number of black pixels.

28. A two-dimensional code reading apparatus according to claim 24, wherein said pattern of a predetermined shape includes a plurality of patterns located at different positions, said cell size determining device determines a plurality of cell sizes in said two-dimensional image on the basis of each of said plurality of patterns, and said reading control device adjusts for each group of cells said reading scope so that said reading scope for cells in a group is determined on the basis of said cell shape calculated from said reference pattern belonging to said group.

29. A two-dimensional code reading apparatus according to claim 24, wherein said cell shape is specified by its width, its height, and angles at four corners of said cell.

30. A two-dimensional code reading apparatus for reading a two-dimensional code wherein binary code data is expressed as a pattern of black and white cells in a two-dimensional matrix, comprising:

a two-dimensional image detecting device for detecting a two-dimensional image of said two-dimensional code;

a reference pattern detecting device for detecting a reference pattern of a predetermined shape existing in said two-dimensional image of said two-dimensional code detected by said two-dimensional image detecting device;

a cell shape calculating device for obtaining an area of a cell of said two-dimensional code in said two-dimensional image on the basis of said reference pattern detected by said reference pattern detecting device;

a reading control device for when a content of a cell is to be read from said two-dimensional image adjusting a size of a reading scope from which the content of the cell is to be read with respect to a cell area obtained by said cell shape calculating device according to a distance of the cell from said reference pattern; and a cell reading device for reading a content of a cell from said reading scope adjusted by said reading control device at a position of each cell of said two-dimensional image.

31. A two-dimensional code reading apparatus according to claim 30, wherein said reading scope adjusted by the reading control device is set smaller than said cell area obtained by said cell shape calculating device.

32. A two-dimensional code reading apparatus according to claim 30, wherein said cell reading device reads for each pixel included in said reading scope whether a type of a pixel is black or white, and a type of pixels constituting a majority of all the pixels included in said reading scope is determined to be a type of a cell.

33. A two-dimensional code reading apparatus according to claim 30, wherein said cell reading device reads for pixels located at predetermined positions in said reading scope whether a type of a pixel is black or white, and determines a type of a cell on the basis of a difference between a number of white pixels and a number of black pixels.

34. A two-dimensional code reading apparatus according to claim 30, wherein said reference pattern of a predetermined shape includes a plurality of reference patterns located at different positions, said cell shape calculating device calculates a plurality of cell areas in said two-dimensional image on the basis of each of said plurality of reference patterns, and said reading control device adjusts said reading scope on the basis of distances of the cell from each of said plurality of reference patterns and said plurality of cell areas calculated from each of said plurality of reference patterns.

35. A two-dimensional code reading apparatus according to claim 30, further comprising: a storing medium which stores a computer program for realizing functions of a plurality of devices.

36. A two-dimensional code reading apparatus for reading a two-dimensional code wherein binary code data is expressed as a pattern of black and white cells in a two-dimensional matrix, comprising:

a two-dimensional image detecting device for detecting a two-dimensional image of said two-dimensional code;

a reference pattern detecting device for detecting a reference pattern of a predetermined shape existing in said two-dimensional image detected by said two-dimensional image detecting device;

a cell shape calculating device for obtaining an area of a cell of said two-dimensional code in said two-dimensional image on the basis of said reference pattern detected by said reference pattern detecting device;

a cell grouping device for grouping cells of said two-dimensional code in said two-dimensional image with a position of said reference pattern detected by said reference pattern detecting device as a reference;

a reading control device for when cells are to be read from said two-dimensional image adjusting for each group of cells formed by said cell grouping device a size of a reading scope from which a content of each of the cells in a group is to be read with respect to a cell area obtained by said cell shape calculating device; and a cell reading device for reading a content of the cell with said reading scope adjusted group by said reading control device at a position of each cell of said two-dimensional image.

37. A two-dimensional code reading apparatus according to claim 36, wherein said reading scope adjusted by the reading control device is set smaller than said cell area obtained by said cell shape calculating device.

38. A two-dimensional code reading apparatus according to claim 36, wherein said cell reading device reads for each pixel included in said reading scope whether a type of a pixel is black or white, and a type of pixels constituting a majority of all the pixels included in said reading scope is determined to be a type of a cell.

39. A two-dimensional code reading apparatus according to claim 36, wherein said cell reading device reads for pixels located at predetermined positions in said reading scope whether a type of a pixel is black or white, and determines a type of a cell on the basis of a difference between a number of white pixels and a number of black pixels.

40. A two-dimensional code reading apparatus according to claim 36, wherein said reference pattern of a predetermined shape includes a plurality of reference patterns located at different positions, said cell shape calculating device calculates a plurality of cell areas in said two-dimensional image on the basis of each of said plurality of reference patterns, and said reading control device adjusts for each group of cells said reading scope so that said reading scope for cells in a group is determined on the basis of said cell area calculated from said reference pattern belonging to said group.

41. A two-dimensional code reading apparatus according to claim 36, further comprising: a storing medium which stores a computer program for realizing functions of a plurality of devices.

42. A two-dimensional code reading apparatus for reading a two-dimensional code wherein binary code data is expressed as a pattern of black and white cells in a two-dimensional matrix, comprising:

a two-dimensional image detecting device for detecting a two-dimensional image of said two-dimensional code;

a reference pattern detecting device for detecting a reference pattern of a predetermined shape existing in said two-dimensional image detected by said two-dimensional image detecting device;

a cell shape calculating device for obtaining a shape of a cell of said two-dimensional code in said two-dimensional image on the basis of said reference pattern detected by said reference pattern detecting device;

a reading control device for when a content of a cell is to be read from said two-dimensional image adjusting a shape of a reading scope from which the content of the cell is to be read with respect to a cell shape obtained by said cell shape calculating device according to a distance of the cell from said reference pattern; and a cell reading device for reading the content of the cell from said reading scope adjusted by said reading control device at a position of each cell of said two-dimensional image.

43. A two-dimensional code reading apparatus according to claim 42, wherein said reading scope adjusted by the reading control device is set smaller than said cell shape obtained by said cell shape calculating device.

44. A two-dimensional code reading apparatus according to claim 42, wherein said cell reading device reads for each pixel included in said reading scope whether a type of a pixel is black or white, and a type of pixels constituting a majority of all the pixels included in said reading scope is determined to be a type of a cell.

45. A two-dimensional code reading apparatus according to claim 42, wherein said cell reading device reads for pixels located at predetermined positions in said reading scope whether a type of a pixel is black or white, and determines a type of a cell on the basis of a difference between a number of white pixels and a number of black pixels.

46. A two-dimensional code reading apparatus according to claim 42, wherein said reference pattern of a predetermined shape includes a plurality of reference patterns located at different positions, said cell shape calculating device calculates a plurality of cell shapes in said two-dimensional image on the basis of each of said plurality of reference patterns, and said reading control device adjusts said reading scope on the basis of distances of the cell from each of said plurality of reference patterns and said plurality of cell shapes calculated from each of said plurality of reference patterns.

47. A two-dimensional code reading apparatus according to claim 42, wherein said cell shape is specified by its width, its height, and angles at four corners of said cell.

48. A two-dimensional code reading apparatus according to claim 42, further comprising a storing medium which stores a computer program for realizing functions of a plurality of devices.

49. A two-dimensional code reading apparatus for reading a two-dimensional code wherein binary code data is expressed as a pattern of black and white cells in a two-dimensional matrix, comprising:

- a two-dimensional image detecting device for detecting a two-dimensional image of said two-dimensional code;
- a reference pattern detecting device for detecting a reference pattern of a predetermined shape existing in said two-dimensional image detected by said two-dimensional image detecting device;
- a cell shape calculating device for obtaining a shape of a cell of said two-dimensional code in said two-dimensional image on the basis of said reference pattern detected by said the reference pattern detecting device;
- a cell grouping device for grouping cells of said two-dimensional code in said two-dimensional image with a position of said reference pattern detected by said reference pattern detecting device as a reference;
- a reading control device for when contents of cells are to be read from said two-dimensional image adjusting for each group of cells formed by said cell grouping device a shape of a reading scope from which the content of each of the cells in a group is to be read with respect to a cell shape obtained by said cell shape calculating device; and
- a cell reading device for reading the content of the cell from said reading scope adjusted group by said reading control device at a position of each cell of said two-dimensional image.

50. A two-dimensional code reading apparatus according to claim 49, wherein said reading scope adjusted by the reading control device is set smaller than said cell shape obtained by said cell shape calculating device.

51. A two-dimensional code reading apparatus according to claim 49, wherein said cell reading device reads for each pixel included in said reading scope whether a type of a pixel is black or white, and a type of pixels constituting a majority of all the pixels included in said reading scope is determined to be a type of a cell.

52. A two-dimensional code reading apparatus according to claim 49, wherein said cell reading device reads for pixels located at predetermined positions in said reading scope whether a type of a pixel is black or white, and determines a type of a cell on the basis of a difference between a number of white pixels and a number of black pixels.

53. A two-dimensional code reading apparatus according to claim 49, wherein said reference pattern of a predetermined shape includes a plurality of reference patterns located at different positions, said cell shape calculating device calculates a plurality of cell shapes in said two-dimensional image on the basis of each of said plurality of reference patterns, and said reading control device adjusts for each group of cells said reading scope so that said reading scope for cells in a group is determined on the basis of said cell shape calculated from said reference pattern belonging to said group.

54. A two-dimensional code reading apparatus according to claim 49, wherein said cell shape is specified by its width, its height, and angles at four corners of said cell.

55. A two-dimensional code reading apparatus according to claim 49, further comprising a storing medium which stores a computer program for realizing functions of a plurality of devices.

* * * * *